US00RE36408E

United States Patent [19]

Yamanaka et al.

[11] E Patent Number: Re. 36,408

[45] Reissued Date of Patent: Nov. 30, 1999

[54] REFRIGERATING APPARATUS AND MODULATOR

[75] Inventors: Yasushi Yamanaka; Kenichi Fujiwara, both of Kariya; Takahisa Suzuki, Obu; Hiroki Matsuo, Anjo; Shin Nishida, Kariya, all of Japan

[73] Assignee: Nippondenso Co., Ltd., Kariya, Japan

[21] Appl. No.: 08/498,077

[22] Filed: Jul. 5, 1995

Related U.S. Patent Documents

Reissue of:

[64] Patent No.: 5,224,358
Issued: Jul. 6, 1993
Appl. No.: 07/962,060
Filed: Oct. 16, 1992

U.S. Applications:

[63] Continuation of application No. 07/770,325, Oct. 3, 1991, abandoned.

[30] Foreign Application Priority Data

Oct. 4, 1990 [JP] Japan ..... 2-267893
Apr. 26, 1991 [JP] Japan ..... 3-96962

[51] Int. Cl.[6] ..... F25B 39/04

[52] U.S. Cl. ..... 62/509; 62/512

[58] Field of Search ..... 62/509, 174, 503, 62/512

[56] References Cited

U.S. PATENT DOCUMENTS

| | | | |
|---|---|---|---|
| 2,715,317 | 8/1955 | Rhodes | 62/3 |
| 3,138,940 | 6/1964 | Wiggins et al. | 62/509 X |
| 3,427,819 | 2/1969 | Seghetti | 62/509 X |
| 3,919,859 | 11/1975 | Ross | 62/509 X |
| 4,091,597 | 5/1978 | Sanderson et al. | 53/59 R |
| 4,191,015 | 3/1980 | Dankowski | 165/179 |
| 4,384,460 | 5/1983 | Vakil | 62/114 |
| 4,562,700 | 1/1986 | Atsumi | 62/509 X |
| 4,831,835 | 5/1989 | Beehler | 62/509 X |
| 4,972,683 | 11/1990 | Beatenbough | 62/507 |

FOREIGN PATENT DOCUMENTS

| | | |
|---|---|---|
| 0360362 | 3/1990 | European Pat. Off. . |
| 0374895 | 6/1990 | European Pat. Off. . |
| 2514484 | 4/1983 | France . |
| 898751 | 7/1949 | Germany . |
| 2636055 | 2/1978 | Germany . |
| 918222 | 2/1963 | United Kingdom . |

*Primary Examiner*—William E. Tapolcai
*Attorney, Agent, or Firm*—Cushman, Darby & Cushman

[57] ABSTRACT

A modulator in a coolant recirculation line for a refrigerating apparatus. The modulator is used for storing an excess amount of the coolant recirculated in the system. The modulator has a space extending vertically, upward and a bottom end connected to the recirculating line at a position downstream of a condenser, in such a manner that only a part of the coolant passed through the condenser is introduced into the modulator to compensate for variations in the amount of coolant needed for recirculation in the system. The modulator can be arranged in the middle of the heat exchanger, and defines therein a boundary between the liquid phase and the gas phase, for a separation of the gas from the coolant, so that the portion of the heat exchanger downstream of the modulator can operate as a super cooler.

32 Claims, 27 Drawing Sheets

REFRIGERATING APPARATUS AND MODULATOR

Matter enclosed in heavy brackets [ ] appears in the original patent but forms no part of this reissue specification; matter printed in italics indicates the additions made by reissue.

This is a continuation of application Ser. No. 07/770,325, filed on Oct. 3, 1991, which was abandoned upon the filing hereof.

BACKGROUND OF THE INVENTION

1. Field of the Invention

The present invention relates to a refrigerating apparatus which can be advantageously used in an air conditioning device for an automobile. The present invention is also related to a modulator used in the refrigerating apparatus.

2. Description of the Related Art

Known in the prior art is a refrigerating device provided with a condenser and a receiver arranged downstream of the condenser. The top end of the receiver is provided with an inlet for introducing therein a condensed coolant from the condenser, and the coolant is stored in a space inside the receiver. In this case, a liquid phase is created below in the space at the liquid-gas interface, and the obtained liquid coolant is fed to a pressure-reducing means for the refrigerating apparatus.

This prior art suffers from a drawback in that all of the amount of coolant for recirculation in a refrigerating cycle must be introduced into a receiver, and a result, in this prior art, an introduction or removal of a large amount of coolant must continuously occur, and thus the dimensions of the receiver are inevitably greatly increased.

Another prior art refrigerator is provided with a condenser constituted by an upper condenser part and a lower super cooling part, and a receiver is arranged between the condenser part and the super cooling part. The coolant condensed at the condenser part is temporarily stored in the receiver, for a gas-to-liquid separation therein, and only the liquid coolant separated in the receiver is returned to the condenser at the super cooling part thereof.

This improved prior art also has a construction such that all of the amount of the coolant recirculated during the refrigerating cycle is introduced from the condenser part into the receiver, and all of the amount of liquid coolant is removed to the super cooling portion of the condenser, and this has a drawback in that the dimensions of the system must be large. Furthermore, connection lines for a communication between the condenser part and super cooling part of the condenser and the receiver are necessary, which makes the construction of the system complicated and difficult to arrange in a limited space in an automobile.

SUMMARY OF THE INVENTION

An object of the present invention is to provide an apparatus capable of overcoming the above-mentioned difficulties in the prior arts.

Another object of the present invention is to overcome these difficulties in the prior arts by providing, in place of the conventional receiver, a small-size modulator as the means for storing an excess amount of the coolant recirculated during the closed refrigerating cycle.

Still another object of the present invention is to provide a refrigerating system having a modulator for use in a refrigerating cycle and having a construction such that it is capable of storing a optimum amount of excess coolant.

A further object of the present invention is to provide a refrigerating system equipped with a modulator and capable of obtaining an as high as possible cooling ability of the system by the provision of a super cooler arranged downstream of the modulator in the direction of the flow of the coolant.

Further, another object of the present invention is to provide a refrigerating system having a super cooling ability due to the provision of a modulator having a simplified construction.

According to the present invention, a refrigerating apparatus is provided which comprises:

a coolant recirculation line;

a compressor in the recirculation line for compressing the coolant;

a condenser in the recirculation line for condensing the compressed coolant;

means in the recirculation line for expanding the condensed coolant by reducing the pressure thereof;

an evaporator in the recirculation line for evaporating the reduced pressure coolant, which is introduced into the compressor, so that a flow of the coolant as recirculated in the recirculation line is created to thereby obtain a refrigerating cycle, and;

a modulator defining therein a chamber for receiving, from the condenser, only a part of the total amount of the coolant recirculated in the refrigerating cycle, the modulator being capable of defining in said space a boundary between the liquid and gas states, for separating the gas from the coolant.

According to the present invention, the modulator does not receive all of the coolant recirculated in the refrigerating cycle. Namely, any excess amount of coolant is introduced into the modulator. This excess amount of the coolant in the modulator is changed in accordance with the cooling ability, as required, and in accordance with variations in the excess amount of coolant, the coolant in the modulator is supplied to the recirculation system or an excess amount of coolant is supplied to the modulator.

Preferably, the modulator has a volume capable of storing the maximum possible excess amount of the coolant for the refrigerating system, to thereby allow a reduction in the size of the system.

Furthermore, because the modulator is arranged between the condenser and the super cooler, a good super cooling ability is obtained, and because a gas-liquid boundary is created in the modulator in which the excess amount of the coolant is stored, only a liquid state coolant is supplied to the super cooler. Namely, merely by arranging the modulator, which is branched from the heat exchanger, in the system, a more efficient super cooling operation can be obtained and a difference in the enthalpy can be increased, resulting in an increase in the cooling ability of the refrigerating system.

Finally, a combined construction of the condenser and the super cooler allows the modulator to be merely branched from the heat exchanger at the middle portion thereof, and thus the modulator can be small in size, and accordingly, the condenser and the super cooler can be made more compact.

BRIEF EXPLANATION OF THE DRAWINGS

FIG. 31' is cross sectional view taken along the line 31'—31' in FIG. 31;

DESCRIPTION OF THE PREFERRED EMBODIMENTS

Embodiments of the present invention will be described with reference to the attached drawings.

Figure 7:
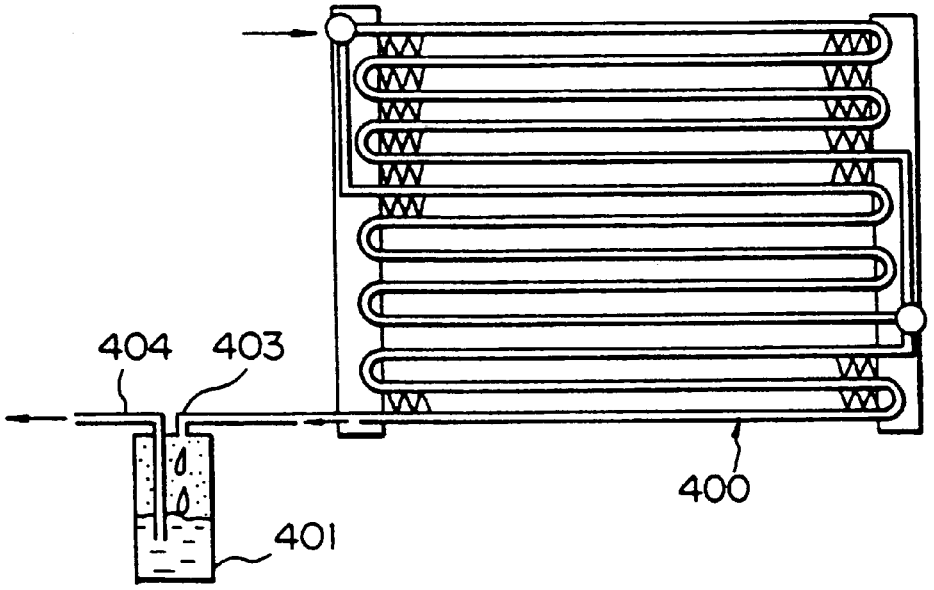
Fig. 7 PRIOR ART
FIG. 7 is a schematic view of refrigerating system of the prior art.

FIG. 7 shows a prior art system provided with a condenser 400 and a receiver 401 arranged downstream of the condenser. The top end 403 of the receiver 401 is connected to the condenser 400, and the coolant from the condenser 400 is once stored in the receiver 401. This prior art suffers from a drawback in that all of the coolant for recirculation is introduced into the receiver 401 and stored therein, and thus a continuous introduction or removal of a large amount of coolant must be made, and accordingly, the dimensions of the receiver 401 are inevitably increased. Another disadvantage is that two pipes necessary for a connection of the condenser 400 to the receiver 401, which makes the construction of a joint portion complicated.

Figure 44:
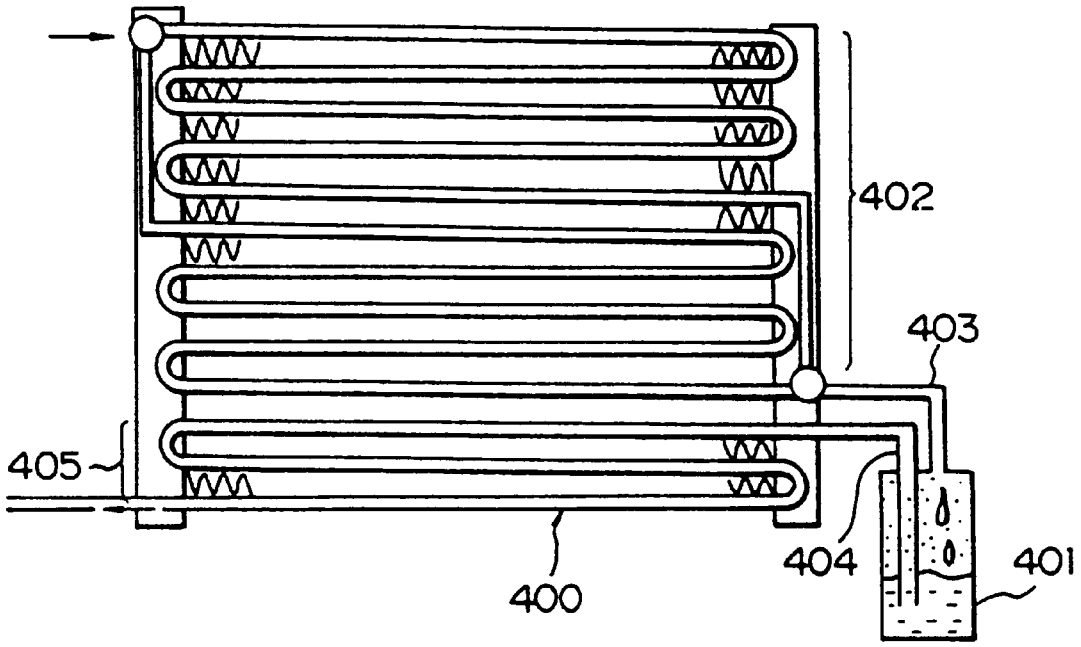
Fig. 44 PRIOR ART
FIG. 44 is a prior art construction of a heat exchanger provided with a super cooler.

FIG. 44 shows another prior art refrigerator which is provided with a condenser 400 constructed by an upper condenser part 402 and a lower super cooling part 405, wherein a receiver 401 is arranged between the condenser part 402 and the super cooling part 405. The coolant condensed at the condenser part 402 is temporarily stored in the receiver 401 for a gas-to-liquid separation, and only the liquid coolant, after separation in the receiver 401, is returned to the condenser at the super cooling part 405. Also in this prior art construction, however, all of the coolant recirculated during the refrigerating cycle is introduced from the condenser part 402 into the receiver 401, and all of the liquid coolant is removed to the super cooling portion 405, and thus the dimension of the system inevitably are large, and further, the joint construction of the system is complicated.

Figure 1:
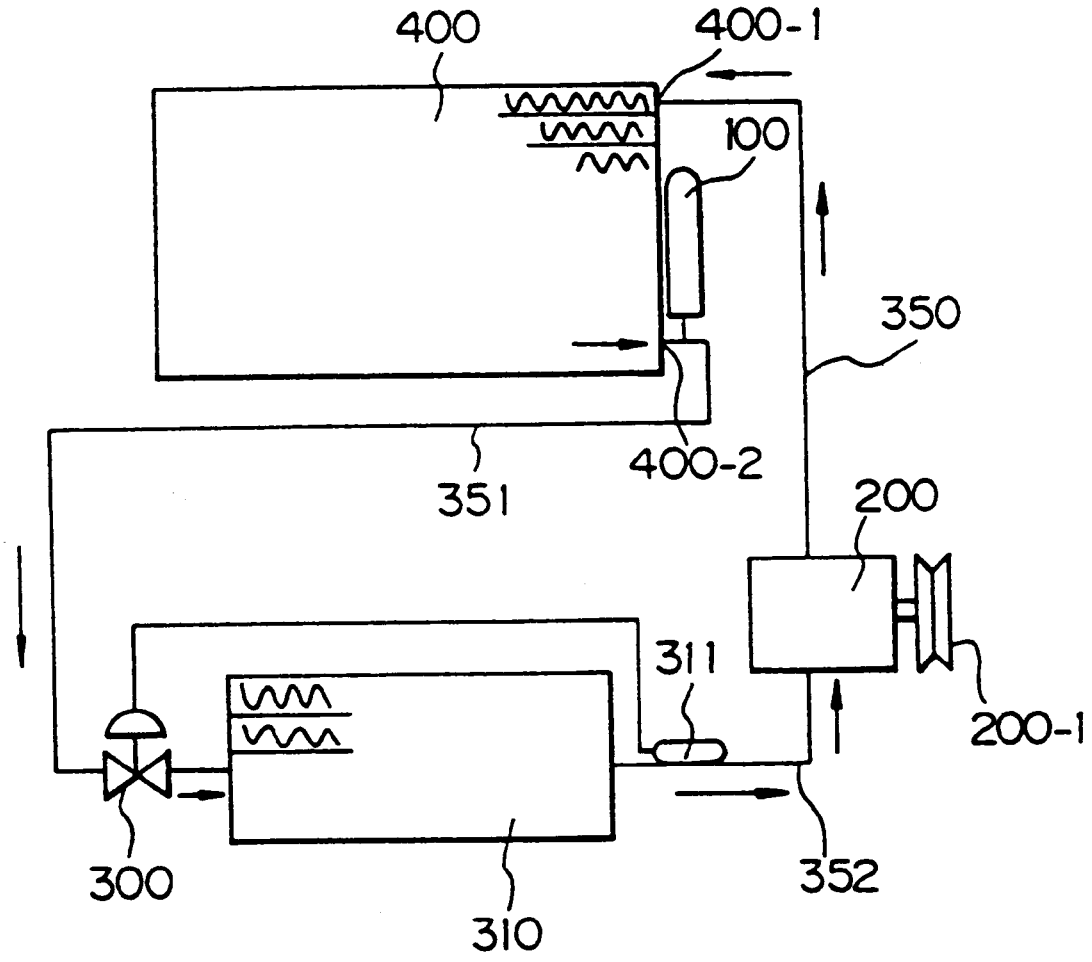
FIG. 1 is a schematic representation of a refrigerating system according to the present invention.

FIG. 1 shows a system illustrating a refrigerating cycle according to the present invention. In the drawing, 200 denotes a compressor having a pulley 200-1 connected to a crankshaft (not shown) of an internal combustion engine via a belt (not shown), whereby the compressor 200 is driven by the engine. The compressor 200 has an output connected, via a coolant pipe 350, to an inlet 400-1 of a condenser 400, for an introduction of a coolant having a high pressure and a high temperature from the compressor 200 into the condenser 400. A heat exchange then takes place in the condenser 400 between the coolant and the outside air, to thereby liquefy the coolant, which is discharged under a high pressure from the outlet 400-2 of the condenser and is introduced into an expansion valve 300, as a pressure reducing means, via a coolant pipe 351. In this embodiment, the expansion valve 300 as the pressure reducing means is a thermally operated type responsive to signals from a thermosensitive tube 311, for controlling a degree of throttling of the pipe 351. A pressure reduction takes place at the expansion valve 300, causing the coolant to be expanded and formed into a mist, and then supplied to an evaporator 310. The evaporator 310 is arranged in a air conditioning device (not shown) for a passenger room of an automobile, so that a heat exchange takes place between the coolant in the evaporator 310 and the air to be air-conditioned, which causes the coolant to be vaporized to thus extract heat from the air to cool same, as is well known.

The evaporated coolant having a low temperature and a low pressure is recirculated into the compressor 200 via a coolant pipe 352.

Figure 2:
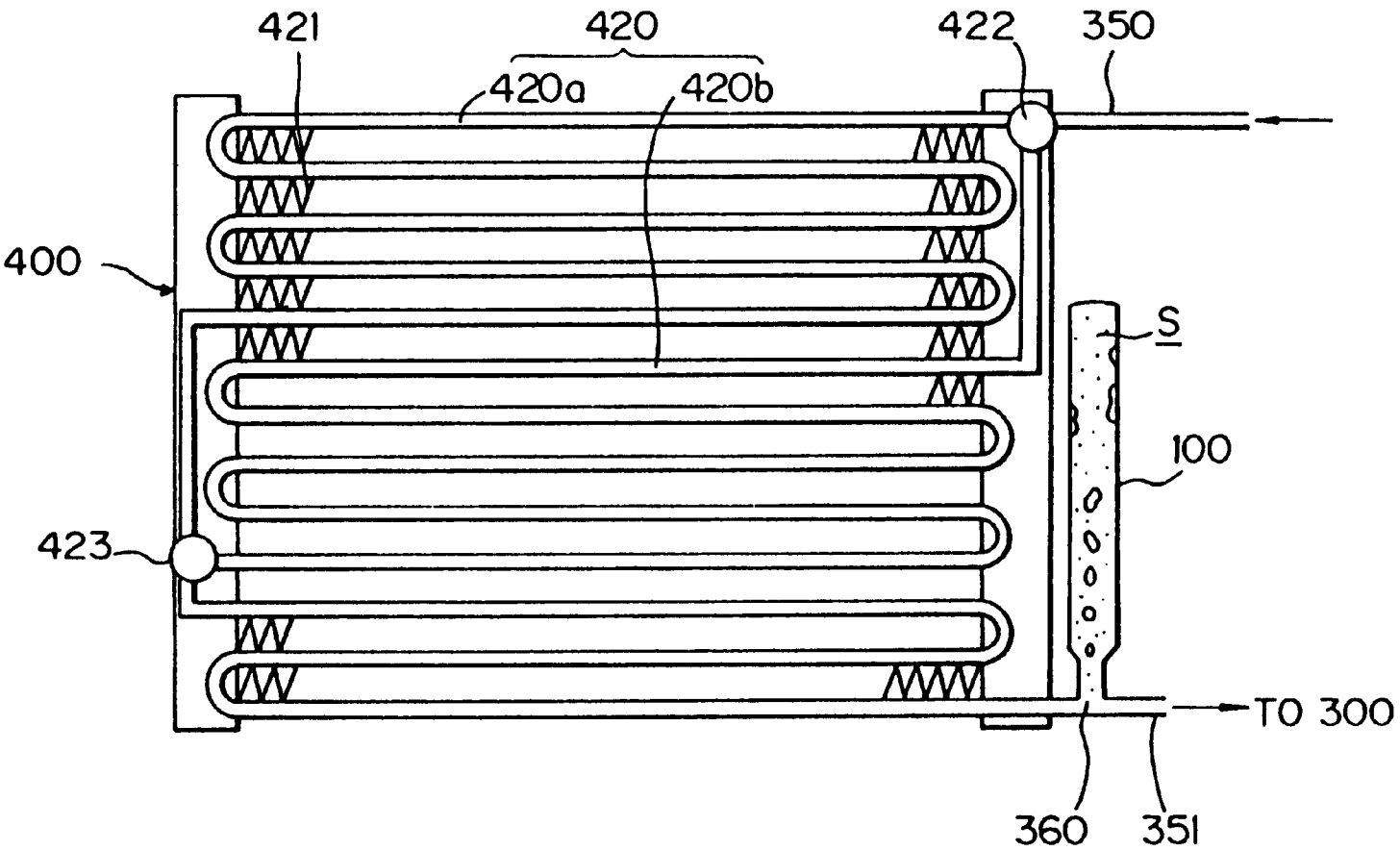
FIG. 2 is a front elevational view of the condenser and a modulator used in FIG. 1.

According to the present invention, a modulator 100 is arranged in the coolant pipe 351 at a position adjacent to the outlet of the condenser 400. As shown in FIG. 2, the modulator 100 has a closed space S therein which extends vertically in such a manner that the coolant pipe 351 near the outlet 400-2 of the condenser 400 is directly and vertically upwardly branched to the space S of the modulator 100 at the bottom end thereof. As shown in FIG. 2, the condenser 400 is composed of a heat exchange tube 420 made from a extrusion pipe having a serpentine shape, through which the coolant passes after the heat exchange. Furthermore, corrugated fins 421 are thermally connected to the outer surface of the serpentine tube 420, to thus increase a heat exchange space between the coolant and the air due to the presence of the corrugated fins 421. As shown in FIG. 2, the condenser 400 is a twin type having two "parallel" serpentine tube portions 420a and 420b connected with each other at the upstream ends thereof by a dividing member 422, so that two parallel flows of the coolant are obtained. The downstream ends of the parallel tube portions are connected with each other by a combining member 423, to combine same and produce a single flow of the coolant to the pipe 351 and the expansion valve 300.

As shown by FIG. 2, basically the total amount of the coolant passed through the condenser 400 is directed to the expansion valve 300. Nevertheless, any excess coolant should be held in the system, to avoid a situation such that, when the amount of coolant in the system is larger than the required amount, a leakage of the coolant occurs and the total amount of the coolant is reduced, and thus a change occurs in the amount of the coolant necessary to cope with changes in an air conditioning load. The space S in modulator 100 is utilized for holding the excess coolant, and is arranged downstream of the condenser 400 such that the branching portion 360 allows the coolant condensed in the condenser 400 to be diverted from the pipe 351, and thus the excess coolant can be accumulated in the modulator 100.

Figure 3:
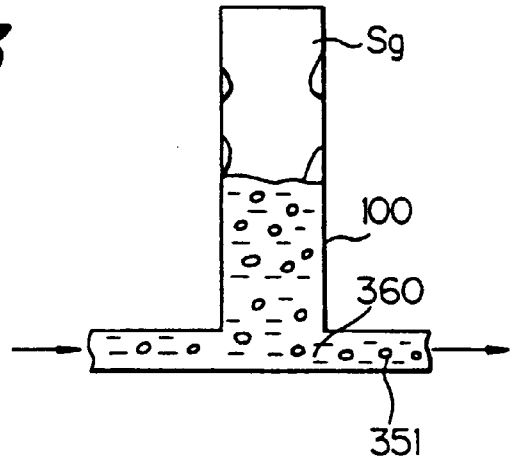
FIG. 3 shows a condition of the coolant in the modulator wherein a medium (proper) amount of coolant is located in the modulator.
Figure 4:
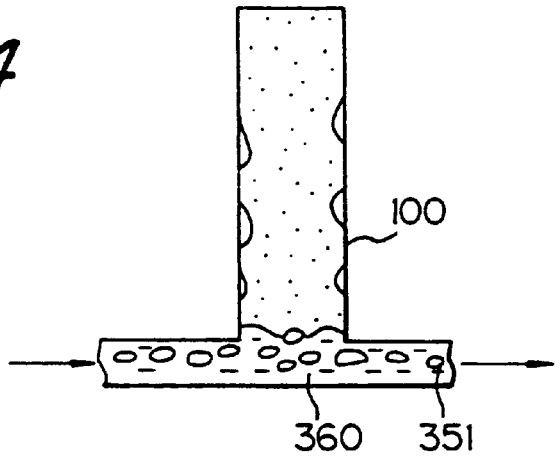
FIG. 4 shows a condition of the coolant in the modulator wherein the modulator is occupied substantially only by a gas state coolant.
Figure 5:
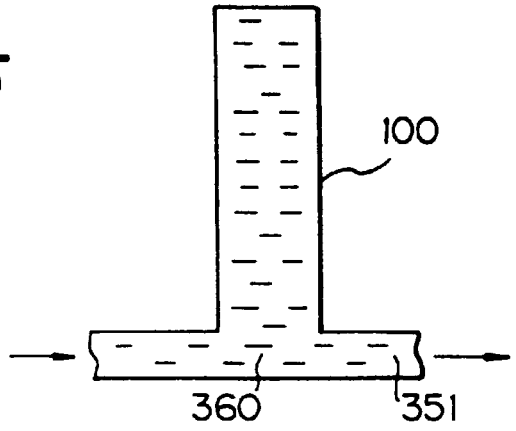
FIG. 5 shows a condition of the coolant in the modulator wherein the modulator is completely filled by a liquid state coolant.

FIGS. 3 to 5 show various states of the distribution of the coolant in the space S in the modulator 100. Under a normal condition, the excess coolant is located in the modulator 100, whereby a gas-to-liquid boundary is created in the modulator 100. Namely, in the state shown in FIG. 3, the introduction of vaporized coolant into the modulator 100 and the removal of the liquefied coolant from the modulator 100 are balanced, whereby a stabilized level of the liquid coolant is created inside the modulator 100. This level corresponds to the amount of coolant in excess of the usual condition of the air-conditioning system.

When a state exists wherein a shortage in the amount of the coolant occurs due to a leakage of the coolant or an increase in the required air-conditioning load, all of the coolant in the condenser cannot be liquefied, and thus a large amount of gaseous coolant is introduced into the modulator 100, causing the liquid state coolant to be discharged into the coolant pipe 351 and the level of the liquid phase in the modulator to be lowered, as shown in FIG. 4. Namely, a shortage in the amount of coolant in the recirculating system is supplemented by feeding the coolant stored in the modulator 100 into the system.

Conversely, when there is an excess amount of coolant in the refrigerating system or when there is a reduction of an air conditioning load, a sufficient amount of the coolant can be condensed in the condenser 400, and accordingly, substantially no gaseous coolant is fed into the pipe 351 toward the expansion valve 300 and only a liquid state coolant is introduced into the modulator 100, and thus the space inside the modulator 100 is completely filled with the liquid state coolant, as shown in FIG. 5. Namely, an amount of coolant in excess of the amount of coolant needed for the recirculation system can be stored in the modulator 100, and thus the amount of recirculated coolant can be suitably adjusted in accordance with the air conditioning requirements.

Figure 6:
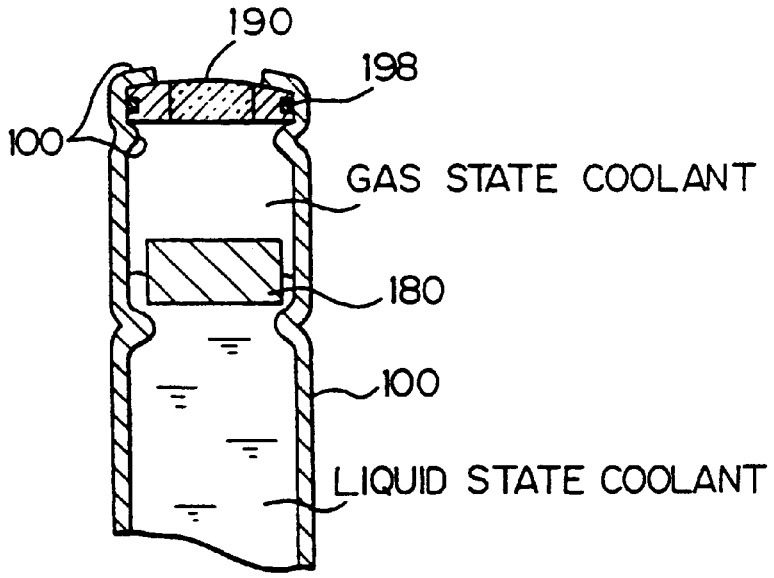
FIG. 6 is an enlarged view of the upper part of the modulator, in a modification thereof.

FIG. 6 shows a modification of the modulator 100, wherein the upper end of the modulator 100 is equipped with a sighting member 190 made of a transparent material such as glass, which allows an inner condition of the modulator 100 to be observed, and as a result a shortage in the amount of coolant or an excessively filled condition of coolant can be detected. In the construction in FIG. 6, a float member 180 is housed in the modulator 100, to facilitate the observation of the level of the liquid-to gas boundary. The sighting glass member 190 is fitted to the upper end of the modulator 100 via an O-ring 198, and portions of the outer thin tubular wall constructing the modulator 100 are radially inwardly deformed along the circumference thereof, so that the sighting glass 190 is firmly held in the tubular member constructing the modulator 100.

As described above, with the modulator 100 of the present invention, any change in the amount of recirculating cooling medium required can be automatically compensated. Furthermore, the coolant is introduced into or fed from the modulator 100 at a limited speed, to ensure a stable condition of the coolant in the modulator 100, which is advantageous because the volume of the modulator 100 can be made as small as possible.

Figure 8:
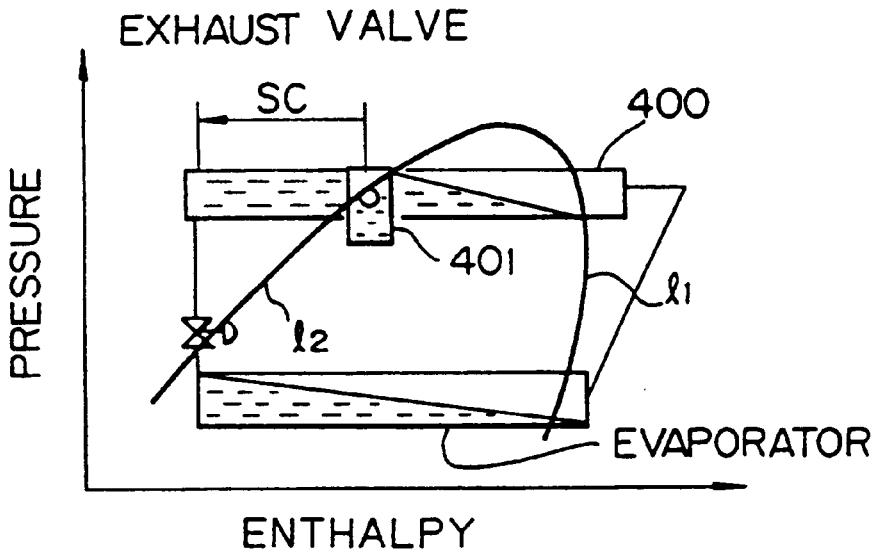
FIG. 8 shows a Mollier diagram illustrating a super cooling, wherein the cooling recirculating system is shown as imposed.

Similar to the prior art shown in FIG. 44, it is possible to divide the condenser into two portions, and to arrange the receiver 400 therebetween, for generating the gas to liquid boundary, whereby the portion downstream of the receiver 400 can be operated as a super cooler. FIG. 8 shows a Mollier diagram wherein the abscissa shows the enthalpy and the ordinate shows the pressure; the solid line 11 and 12 show the saturated gas and liquid states, respectively. As is well known, the area inward of the lines 11 and 12 corresponds to the area wherein the gas and liquid states coexist, the area on the right hand side of the line 11 corresponds to the area wherein only the gas state exists, and the area on the left hand side of the line 12 corresponds to the area wherein only the liquid state exists. Note, the receiver 401 should be located on the saturated line 12, and therefore, a super cooling will take place in the area SC of the condenser 400 downstream of the receiver 401. This super cooling can increase the difference in the value of the enthalpy, and thus increase the cooling efficiency of the refrigerating apparatus.

Figure 9:
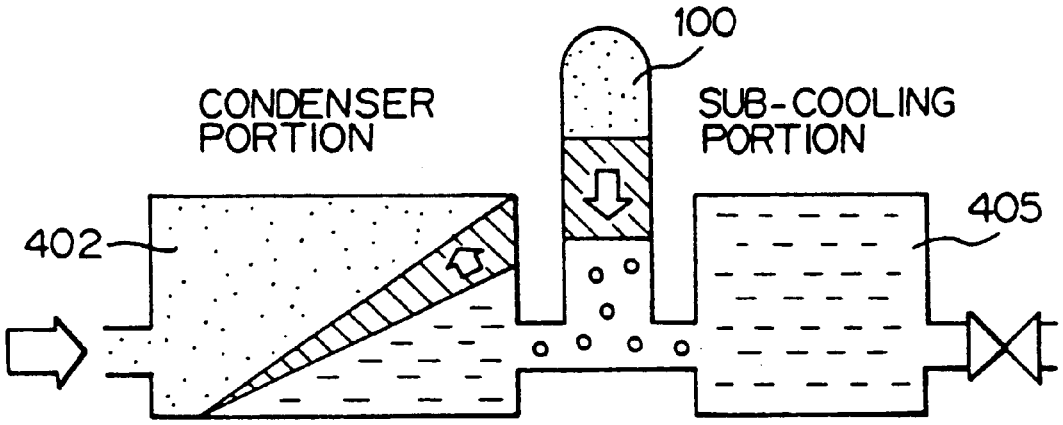
FIG. 9 is a view for explaining an operation of a system according to the present invention provided with a modulator between the condenser portion and the sub-cooling portion.

FIG. 9 is a schematic view of the refrigerating apparatus wherein the modulator 100 according to the present invention is used in place of the receiver 401 of the prior art. As shown in FIG. 9, a gas-liquid boundary also can be created in the modulator 100 such that the coolant is in a saturated liquid state at a position where the modulator 100 is located, and as a result, the heat exchanger located downstream of the modulator 100 serves as a sub cooling portion 405, i.e., as a super cooler, and the portion 402 of the heat exchanger located upstream of the modulator 100 serves as a condenser.

Note, the condensed condition of the medium in the condenser portion 402 depends on the cooling load. In the condenser portion shown in FIG. 9, the area designated by dots is in a gas state and the area designated by spaced short bars is in a liquid state. In the areas shown by oblique lines, the gas and liquid states occur in accordance with the required cooling load. Such changes in the condensing ability at the condenser portion 402 can be absorbed by the provision of the modulator 100. Namely when a situation occurs in which the cooling load is so high that all of the coolant cannot be condensed in the condenser portion 402, a discharge of an amount of gaseous coolant occurs. This gaseous coolant however, is absorbed by the modulator 100, and accordingly, a liquid state coolant in the modulator 100 is discharged to the sub-cooling portion 405, whereby an effective super cooling operation is obtained at the sub-cooling portion 405.

Figure 10:
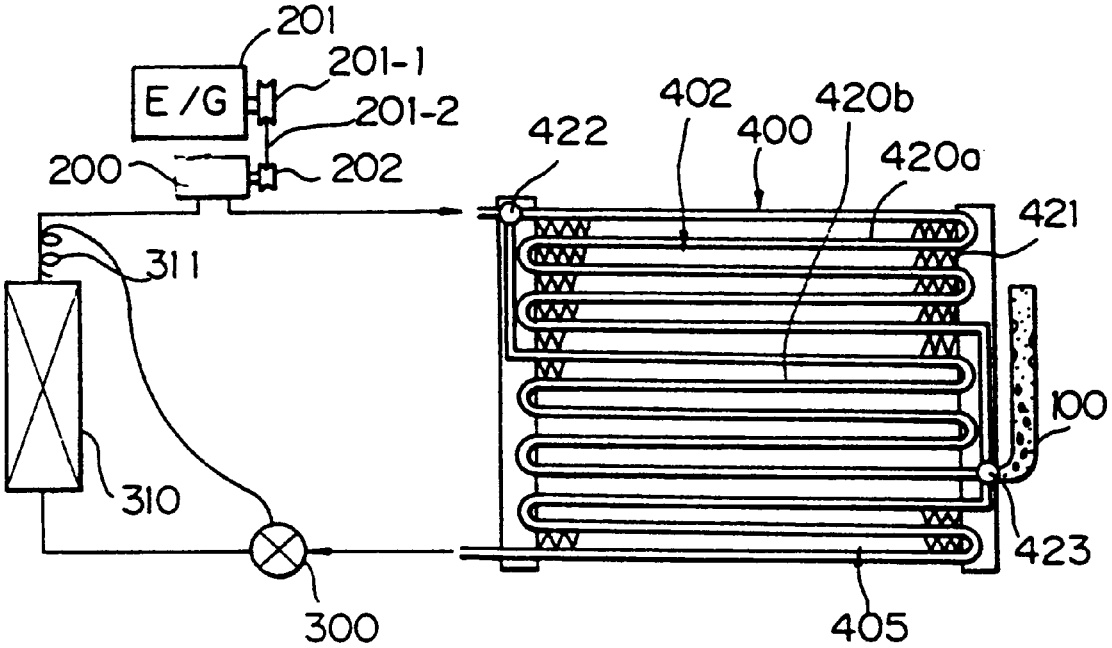
FIG. 10 is a schematic view of the cooling system in an automobile provided with a heat exchange device having a modulator branched therefrom at the middle portion thereof.
Figure 11:
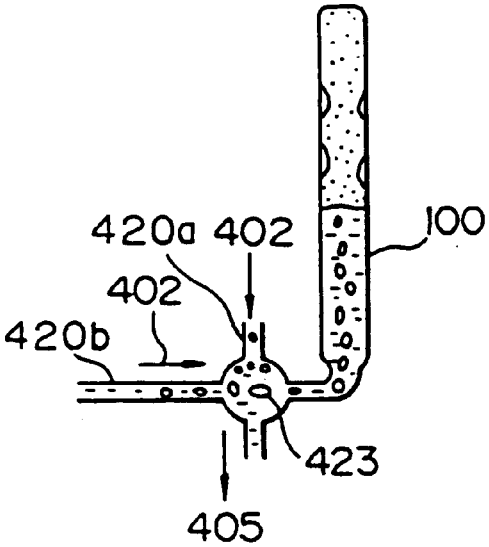
FIG. 11 is a detailed view of the branched portion of FIG. 11.

FIG. 10 shows the entire air conditioning system for an automobile, which system is provided with a condenser having the construction schematically shown in FIG. 9 wherein a modulator 100 is arranged between the condenser part 402 and the super cooler 405 in the condenser 400. Reference numeral 201 denotes an internal combustion engine having a crankshaft on which a pulley 201-1 is mounted. The pulley 201-1 is connected, via a belt 201-2, to a pulley portion of an electromagnetic clutch device 202, and the clutch 202 is selectively engaged for transmitting the rotational movement of the engine to the compressor 200. In the embodiment shown in FIG. 10, the condenser portion 402 is a parallel twin type having parallel-connected serpentine pipes 420a and 420b which are connected to each other at a manifold 423. The modulator 100 is branched from the manifold 423 such that it is directed upward therefrom. Namely, the manifold 423 is provided with four branch portions; two being connected to the serpentine pipes 420a and 420b of the condenser portion 402, one being connected to the sub cooling portion 405, and one being connected to the modulator 100 as shown in FIG. 11.

Figure 12:
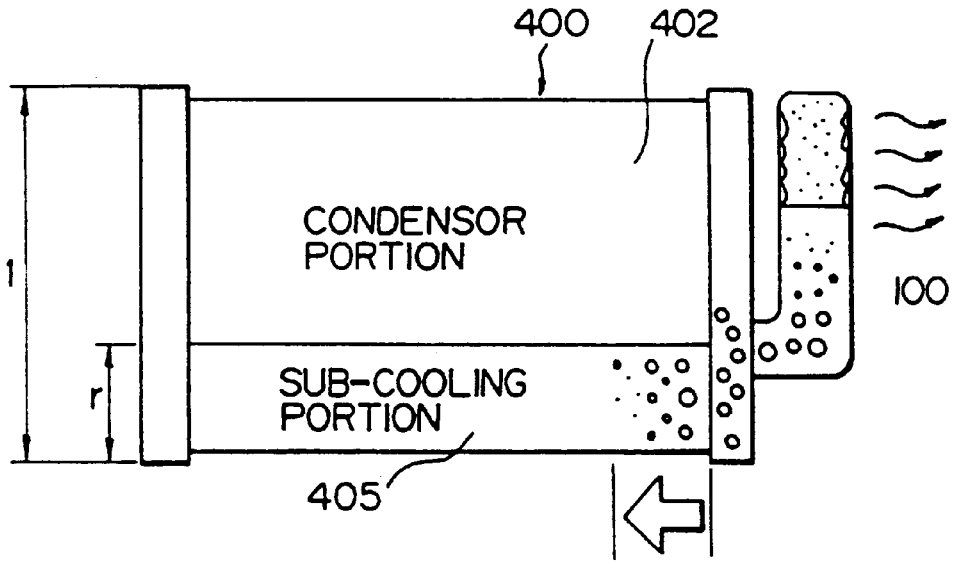
FIG. 12 is a schematic view of the heat exchanger having a modulator branched therefrom, for a definition of a ratio of areas between the condenser portion and sub-cooling portion.

FIG. 12 is a schematic view of a construction of the heat exchanger 400 shown in FIG. 10. In this type of heat exchanger 400, the provision of the modulator 100 allows the portion 402 downstream of a position branched to the modulator 100 to act as a condenser part for condensing the coolant. The portion 405 downstream of the position branched to the modulator 100 operates as a sub-cooling portion, to thereby obtain a super cooling effect.

Figure 13:
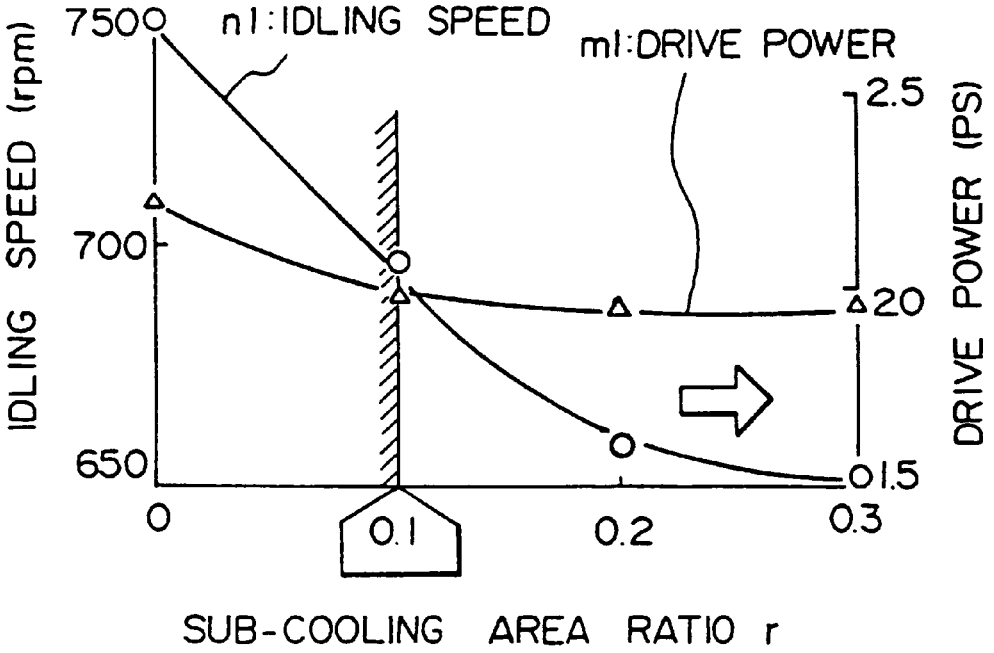
FIG. 13 is a graph showing a relationship between a sub-cooling portion area ratio to the engine idling speed and to the compressor drive power.

In the embodiment of the heat exchanger 400 wherein the modulator 100 is branched from an intermediate portion thereof, the determination of a desired position at which modulator will be branched therefrom is discussed in relation to the results of experiments. In FIG. 12, assuming that the total surface area of the heat exchanger is 1, and the surface area of the sub-cooling portion is r, the optimum position for the branching the modulator 100 is determined by changing the ratio of the surface area of the sub-cooling portion r to the total surface area. In FIG. 13, the abscissa is a value of the sub-cooling area ratio r, and the ordinate shows an engine idling speed or drive power for the compressor (hose power). The measurement is carried out under a condition in which the temperature of air introduced into the evaporator 310 is 35 degrees centigrade, the relative humidity is 60%, the flow amount is 500 cubic meter per hour, the temperature of air introduced into the heat exchanger 400 is 40 degrees centigrade, and the wind speed is 2 meters per second. A line m1 shows a change made in the drive power for the compressor 200 with respect to the change in the ratio r, to thereby obtain a cooling ability equal to that obtained when the sub-cooling ratio is zero. As shown by a line n1, a change in an engine idling speed is measured when the ratio r is changed, to thereby obtain a cooling ability equal to the cooling ability under the zero sub-cooling condition. The drive power m1 for the compressor 200 was calculated from the line n1, in a well known manner.

When the sub-cooling portion 405 has a large area, the super cooling speed of the coolant can be made high, and therefore, as it will be easily understood from the Mollier chart shown in FIG. 8, a large difference in the enthalpy can be obtained, and thus the cooling ability can be increased. Basically, this means that the larger the sub-cooling area the greater the cooling ability, enabling a reduction in the drive power while maintaining the same cooling ability.

Nevertheless, an increase in the area of the sub-cooling portion 405, while maintaining a constant value of the area for a heat emission by the heat exchanging device 400, causes a reduction of the area of the condenser portion 402.

This means that it is necessary to use the small area for heat emission to liquidize the coolant, which causes the pressure of the coolant at the condenser portion 402 to be increased. Such an increase in the coolant pressure at the condenser portion 402 brings an adverse effect, in that the drive power for the compressor 200 must be increased.

FIG. 13 shows this contradictory requirement between the increase in the cooling ability by an increase in the area of the sub-cooling portion 402 and the prevention of an increase in the drive power for the compressor due to a reduction of the area of the compressor portion 402. Generally speaking, a higher value of the sub-cooling ratio r is more preferable, but as is clear from FIG. 13, the value of the sub-cooling ratio cannot be higher than 0.1 if a substantial reduction of the drive power of the compressor 200 is to be obtained.

FIG. 13 also shows a change in the drive power of the compressor needed to obtain a predetermined cooling ability when the engine is idling. The engine to which the compressor 310 is connected is subjected to various running conditions by which the engine speed is determined regardless of the cooling ability requirements. Therefore, it is necessary to determine the desired value of the sub-cool area while the vehicle is actually running.

Figures 14A, 14B, 14C:
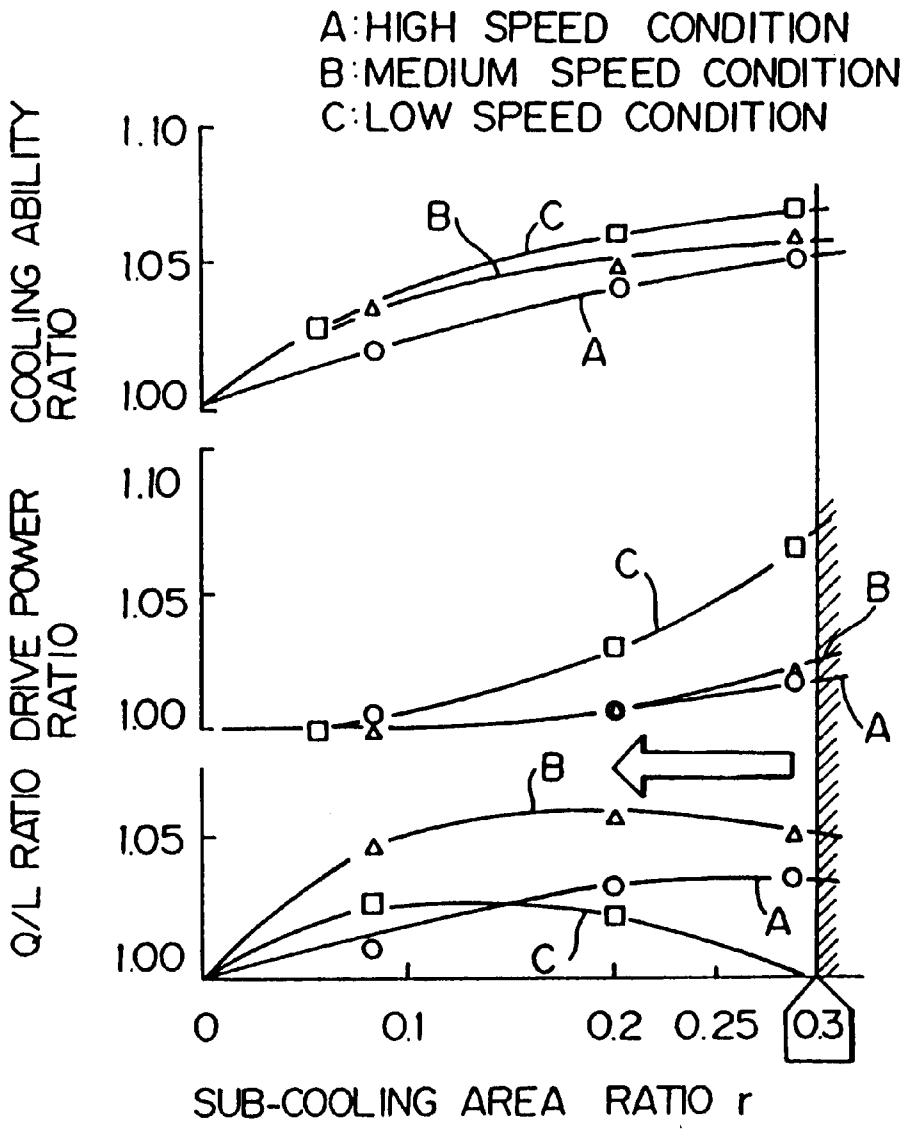
FIGS. 14(a) to (c) show a cooling ability ratio, drive power ratio, and a cooling ability-drive power ratio, respectively, of the present invention over the prior art construction, with regard to various cooling load conditions.

FIGS. 14(a), (b) and (c) show the values of the cooling ability (Q), drive power (L), and the cooling ability-to-drive power ratio (Q/L), respectively, obtained by the heat exchanger according to the embodiment shown in FIG. 10, provided with a super cooler, in relation to those obtained by a heat exchanger without a super cooler (FIG. 1). In each of FIGS. 14(a), (b) and (c), a solid line A corresponds to a high speed condition of the vehicle, and a high thermal load applied to the refrigerating apparatus. In more detail, under the condition A, the temperature of the air introduced into the evaporator 310 is 35 degrees centigrade, the total air amount is 500 cubic meters per hour, and the rotational speed of the engine 201 is 3,600 r.p.m. A solid line B corresponds to a medium speed condition of the vehicle, and a medium thermal load applied to the refrigerating apparatus. In more detail, under the condition B, the temperature of the air introduced into the evaporator 310 is 27 degrees centigrade, the total air amount is 400 cubic meters per hour, and the rotational speed of the engine 201 is 1,800 r.p.m. Finally, a solid line C corresponds to a low speed condition of the vehicle, and a low thermal load applied to the refrigerating apparatus. In more detail, under the condition C, the temperature of the air introduced into the evaporator 310 is 25 degrees centigrade, the total air amount is 300 cubic meters per hour, and the rotational speed of the engine 201 is 1,000 r.p.m. As previously explained, in general an increase in the cooling ability is obtained by an increase in the area of the sub-cooling portion 405, but this increase in the sub-cooling area causes an increase in the drive power due to an increase in the pressure of the coolant at the condenser portion 402. This means that an optimum value of the cooling ability-to-drive power ratio (Q/L) should be determined from the cooling ability and the drive power. The results of the experiments show that, when the vehicle is operating under the low speed and low load area C, a sub-cooling area ratio larger than 0.3 can cause a worsening of the cooling ability compared to that obtained without a provision thereof, since the sub-cooling area ratio becomes smaller than a value of 1.0. Therefore, preferably the sub-cooling area ratio r is in a range of between 0.1 and 0.3, to thereby obtain an effective operation of the refrigerating apparatus over the entire range of operation of the vehicle.

Figure 15:
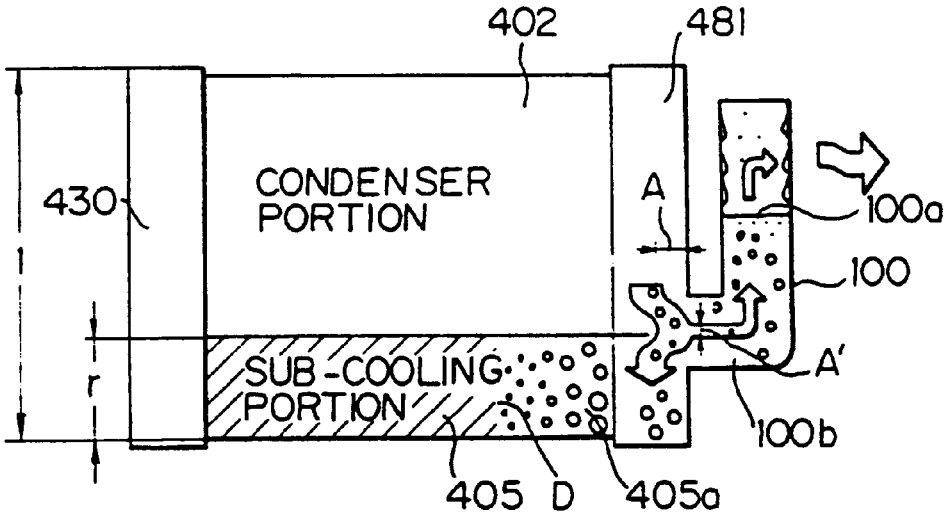
FIG. 15 is a diagrammatic view of the heat exchanger for illustrating a super cooling operation at the sub-cooling portion.

The inventors also found that, to obtain a proper super cooling operation at the sub-cooling portion 405, the condensing operation at the modulator 100 is important. In FIG. 15, a flow of the air for cooling is contact with not only the condenser and sub-cooling portions 402 and 405 but also the modulator 100, which causes the gaseous cooling medium to be condensed therein. In this case, the gas-liquid boundary 100a at the modulator 100 is under a saturated liquid condition, which is obtained as a result of cooling operation due to a heat emission at the modulator 100. Namely, even if the coolant introduced into the modulator 100 is in a partly dried state of a gas and liquid as combined, the cooling effect caused by the heat emission at the modulator 100 itself can maintain the gas-liquid boundary 100a in the modulator 100. In more detail, the coolant at the connection area 100b is under the combined state wherein the coolant is basically in a liquid state but includes a small amount of gas. Nevertheless, an equalized state can be obtained inside the modulator 100, and as a result, the condition of the coolant at the inlet portion 405a of the sub-cooling portion 405 is the same as the condition of the coolant at the inlet portion 100b of the modulator 100, and thus the coolant in the liquid state including a small amount of gas is introduced into the sub-cooling portion 405. Therefore, at the sub-cooling portion 405, a condensing operation of the gas portion in the combined gas and liquid medium is first obtained, and thereafter, the super cooling operation is obtained. In FIG. 15, the coolant can obtain the saturated condition along the area D, and thus the super cooling operation is obtained in the sub-cooling portion 405 at an area downstream of the line D, as designated by the shaded lines.

As explained above, the heat emission at the modulator 100 reduces the effective area for super cooling at the sub-cooling portion 405. A gas flowing-out ratio, in the total amount of the gas component in the coolant passed through the condenser portion 402, is defined as a ratio between the amount of gas introduced into the modulator 100 and the amount of gas flowing into the sub-cooling portion 405. Namely, where there is an emission of heat at the modulator 100, the amount of gas flowing into the sub-cooling portion 405 is equal to the amount of gas condensed at the modulator multiplied by the gas flow rate. This means that the amount of gaseous coolant flowing into the sub-cooling portion 405 corresponds to the degree of condensing at the modulator 100. Namely, the larger the amount of gas phase coolant in the modulator 100, the smaller the amount of gas phase coolant flowing into the sub-cooling portion 405, which increases the super cooling efficiency at the sub-cooling portion 405.

In view of the above, the gaseous coolant must be positively introduced into the modulator 100. In FIG. 15, A is a value of effective area of the coolant passageway, and A' is a value of effective area of the branch passageway to the modulator 100. In this case, the amount of gaseous coolant introduced into the modulator 100 is equal to the amount of gaseous coolant passing through the coolant multiplied by A'/A. Namely, the gas flowing out ratio corresponding to A'/(A—A'), so that the larger the effective area of the branch pipe of the modulator 100, the smaller the amount of gaseous coolant.

Figure 16:
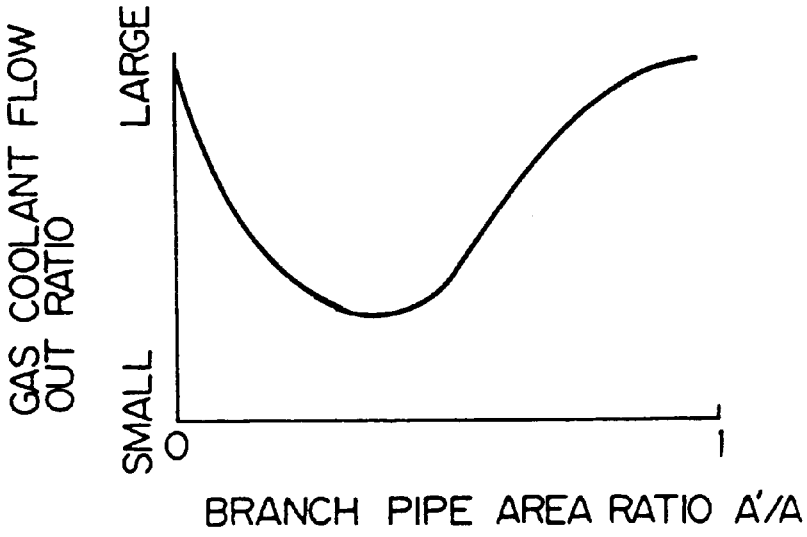
FIG. 16 shows a relationship between the area ratio (A'/A) of the branch pipe to the modulator and a gas state coolant flow out ratio.

When the effective area A' of the branch pipe to the modulator 100 is too large, however, the flow speed of the coolant in the modulator 100 becomes too high, and it becomes difficult is separate the gas state coolant from the flow of the coolant, and thus the gaseous coolant flow out ratio becomes large. FIG. 16 shows a relationship between the ratio of the effective area of the branch pipe to the modulator 100, to the effective area of the coolant passageway, A'/A, and the gaseous coolant flow out ratio. As will be easily understood, a suitable value of the A'/A must be selected to obtain the desired result.

Figure 17A:
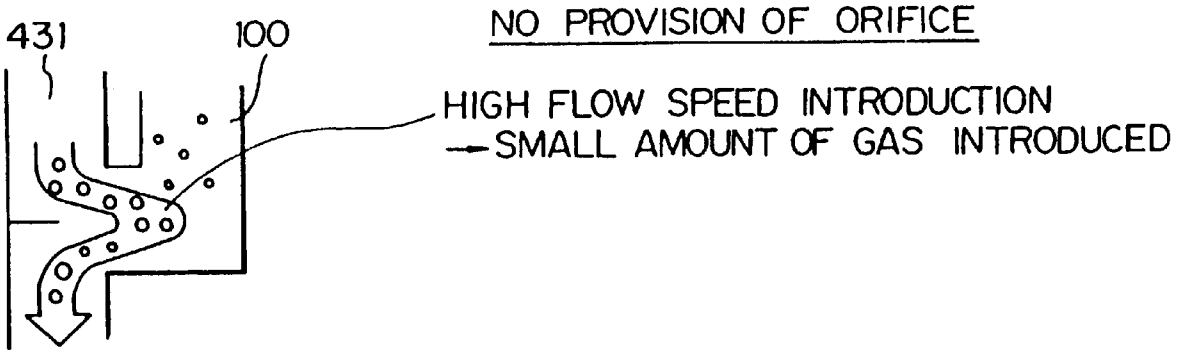
FIGS. 17(a) and 17(b) illustrate a change in a condition of a separation of gas state coolant in the modulator, with or without a limiting means.
Figure 17B:
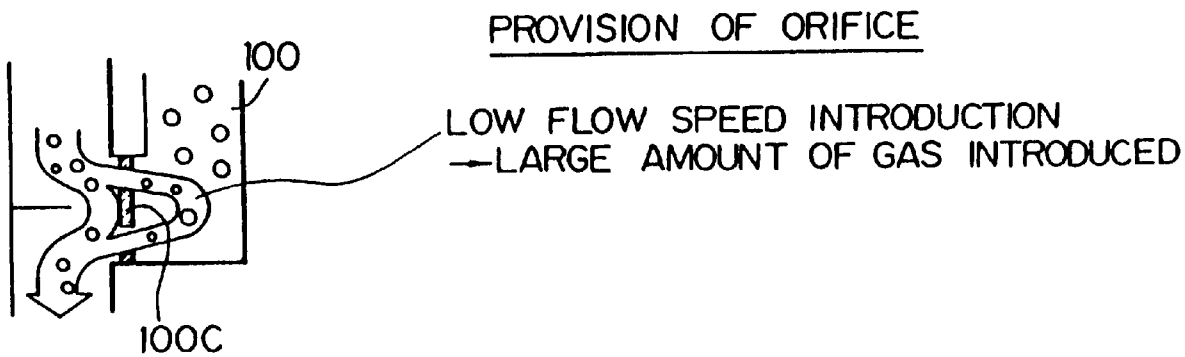

FIG. 17 is a schematic view of the condition of the coolant at the branch portion to the modulator 100. The upper part (a) of FIG. 17 show a situation wherein the branch pipe to the modulator 100 has no means for controlling the flow into the modulator 100, and it is clear that an excessively high speed flow of the coolant in the coolant passageway at the branch portion to the modulator 100 is generated, which causes a separation of the gas state coolant by a buoyancy thereof to become difficult. The lower part (b) of FIG. 17 shows a situation wherein a speed limiting means 100-c (plate with openings) is provided for a separation of the flow of gas to the branch pipe to the modulator. This limitation of the speed of the coolant flowing into the modulator 100 by the plate 100c facilitates the separation of gas in the modulator 100 due to the buoyancy thereof.

Figure 18:
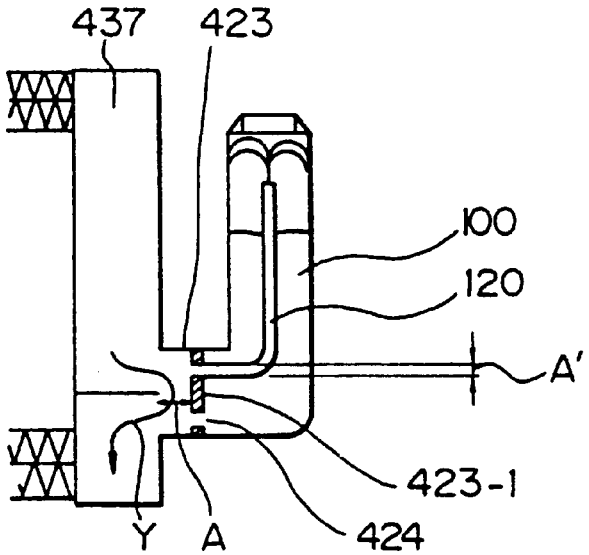
FIG. 18 schematically shows a modulator provided with an air induction pipe.
Figure 19:
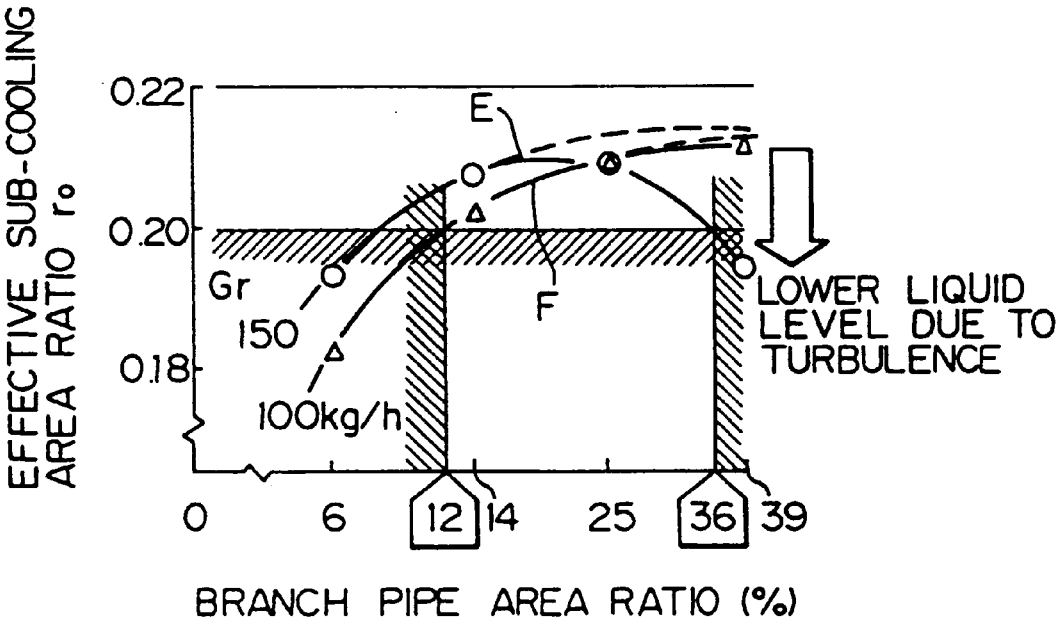
FIG. 19 shows the relationship between the branch pipe area ratio and the effective sub-cooling area ratio $r_0$.

FIG. 18 shows an embodiment in which the above explained provision of separate flows is introduced. The branch pipe 423 is provided therein with a partition 423-1, which forms an opening for a connection with an introduction pipe 120 having an effective area of A', the value of which is determined so that a desired introduction of the gaseous coolant is obtained. The partition wall 423-1 forms openings 424 to ensure a continual connection with the bottom portion of the modulator 100. FIG. 16 shows that, to obtain an effective super cooling operation, the ratio A'/A should not be too large and should not be too small. The following is a result of an experiment made to confirm this finding. In FIG. 19, the abscissa is the ratio A'/A, which is the ratio of the area of the pipe 120 to the area of the coolant passageway in which the coolant flows as shown by an arrow Y, and the ordinate is the effective area of the sub-cooling portion 405, or, which is the ratio $r_0$ of the area of the sub-cooling portion producing an effective super cooling operation (the shaded line area in FIG. 15) to the total effective area of the sub-cooling portion 405 of the heat exchanging apparatus. A solid line E shows a situation wherein the amount of coolant recirculating in the refrigerating system is 100 kg per hour, and a solid line F is a situation wherein the amount of coolant recirculating in the refrigerating system is 150 kg per hour. The effective sub-area ratio A'/A indicates, with regard to the total effective heat exchange surface area, a rate of a surface area of the part of the sub-cooling portion where an effective super cooling of the coolant is obtained. This means that the larger the sub-cooling area ratio A'/A, the more effective is the super cooling effect. The experimental result in FIG. 19 shows that a large effective sub-cooling area ratio can be obtained when the branch pipe area ratio A'/A is in a range of between 12 to 36%.

Note, in the embodiment shown in FIG. 18, the induction pipe 120 is arranged to be opened to the space inside the modulator at the upper portion thereof, and as a result, in addition to the advantage of a setting of the desired value of the branch pipe area ratio, an additional advantage is obtained in that a degree of dryness of the gas-liquid coolant at the branch position is reduced because the gaseous coolant is directly introduced into the upper part of the space inside the modulator 100.

Figure 20:
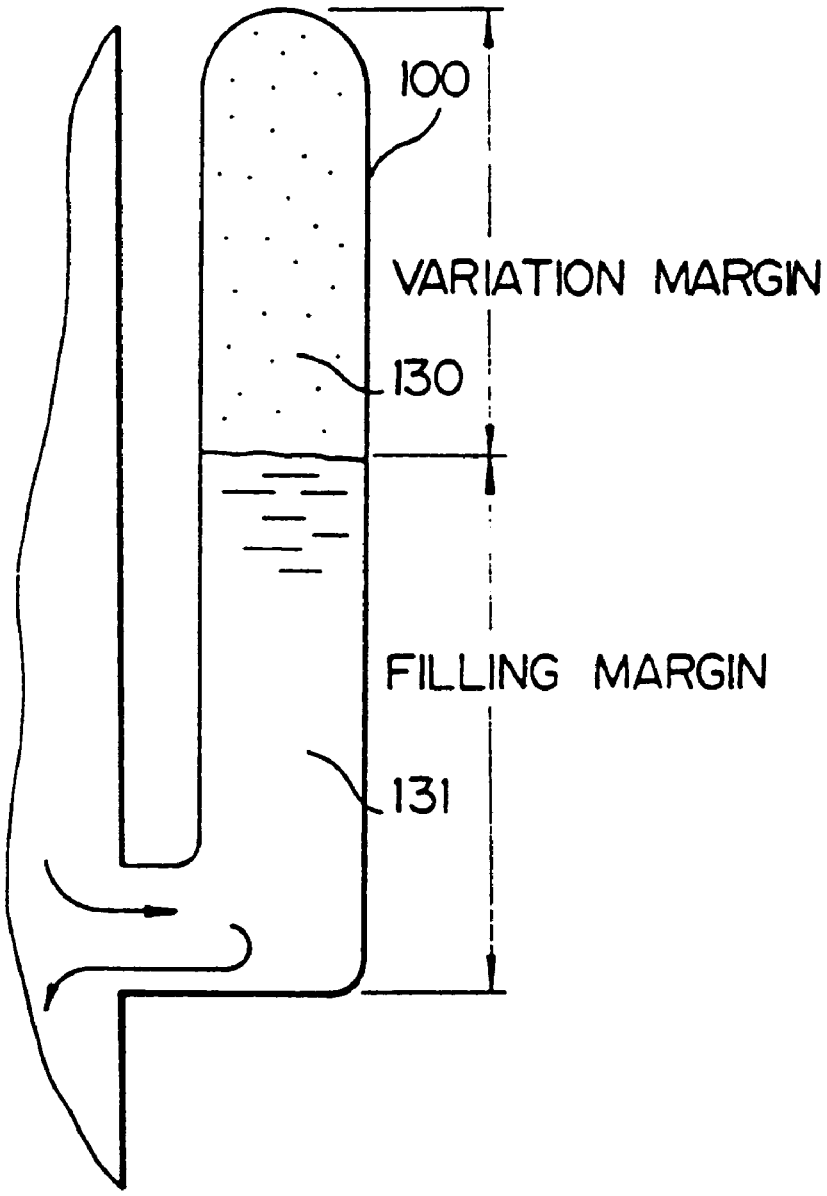
FIG. 20 illustrate a filling margin portion and variation margin portion provided in the modulator.
Figure 21:
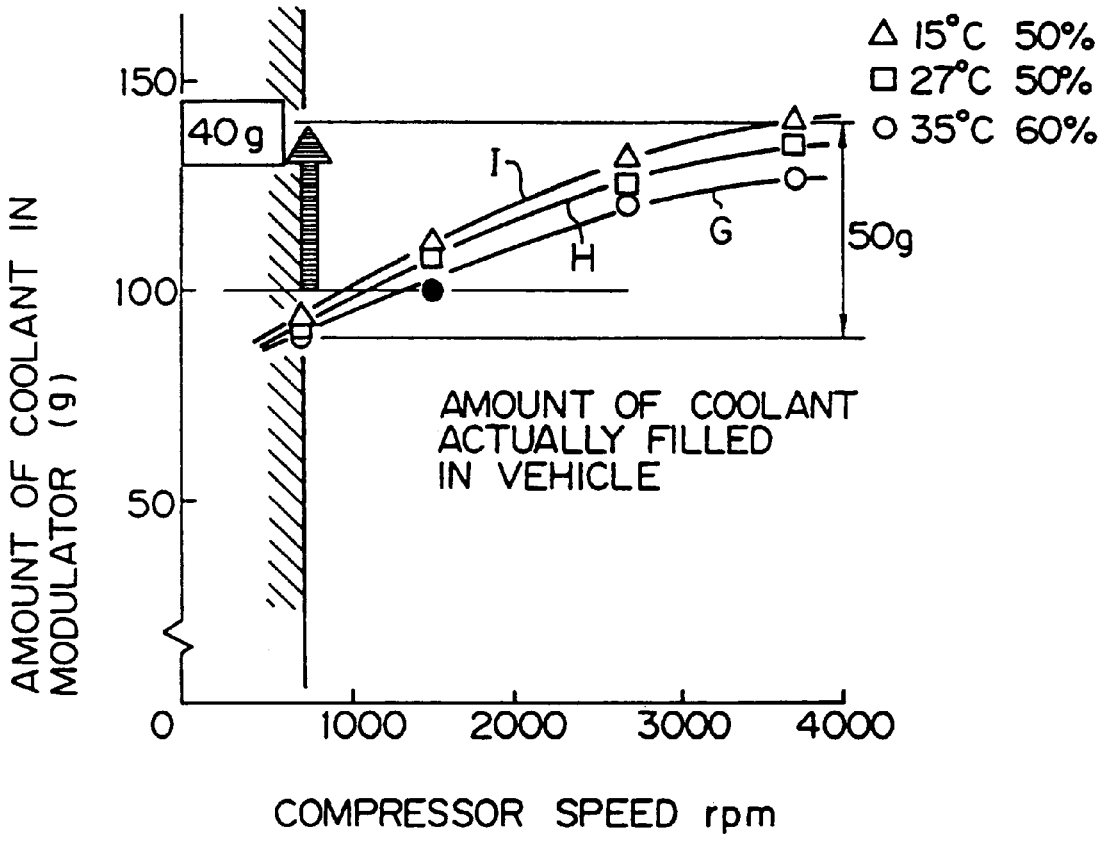
FIG. 21 illustrate a relationship between a rotational speed of the compressor and the amount of coolant in the modulator, with regard to various vehicle running conditions.

A desired volume of the modulator will now be discussed with reference to FIG. 20, which shows a schematic construction of the modulator 100. The modulator 100 should be constructed by a lower filling margin portion 131 below the gas-to-liquid boundary and an upper variation margin portion 130 above the gas-to-liquid boundary. The lower portion 131 is used for supplementing an amount of the coolant which may leak from the refrigerating apparatus after a prolonged use thereof, and the upper portion 130 is used for absorbing a change of the necessary amount of coolant recirculated in the refrigerating apparatus, which depends on variations of the cooling load of the system. A value of 100 grams is usually required for the volume of the filling margin portion 131, but a preferable value of the variation margin portion 120 was not known, and therefore, experiments were carried out by the inventors of the present invention. In these experiments, the refrigerating apparatus is operated under various operating conditions, to obtain an amount of the coolant held in the modulator 100. FIG. 21 shows the result of these experiments. In FIG. 21, the abscissa is a rational speed of the compressor, and the ordinate is an amount of the coolant in the modulator 100. In FIG. 21, a solid line I is a low load coolant condition where the temperature is 15 degrees centigrade and the humidity is 50%, a solid line H is a medium load condition where the temperature is 27 degrees centigrade and the humidity is 50%, and a solid line G is a high load condition where the temperature is 35 degrees centigrade and the humidity is 60%. As will be clear from FIG. 5, over the entire range of the engine load, the amount of coolant required is between 90 to 140 grams. As already explained, to fill the margin portion 131, 100 grams of coolant are required, and therefore, for the variation margin portion 130 it is considered that a space for about 40 grams of coolant is required.

Figure 22:
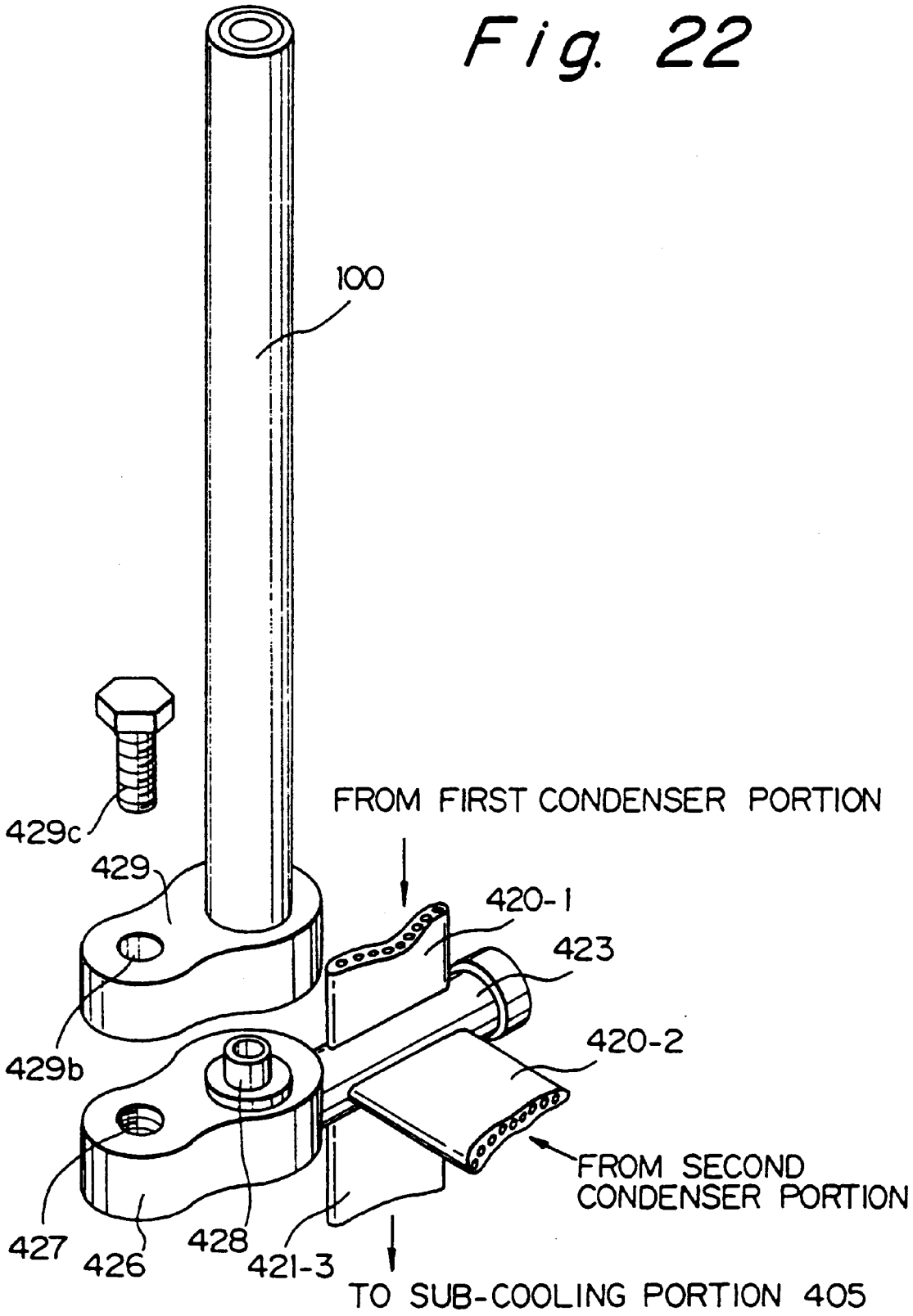
FIG. 22 is a dismantled, perspective view of the modulator in the system shown in FIG. 10.
Figure 24:
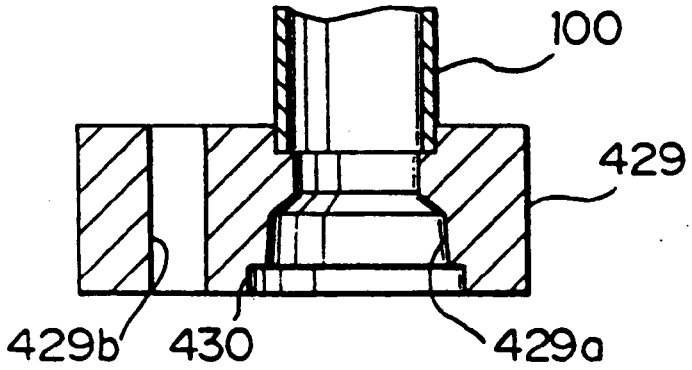
FIG. 24 is a cross sectional view of a lower joint in the modulator in FIG. 22.

In view of the result of the above experiments, the inventors found a preferable construction of the modulator 100, which is connected to a refrigerating system for an operation thereof. The actual construction of the modulator 100 will be explained as follows. As shown in FIGS. 10 and 11, a construction is employed whereby the modulator 100 is branched from the manifold pipe 423, which is shown on an enlarged scale in FIG. 22, and from the manifold pipe 423, tubes 420-1 and 420-2 to the condenser portions 402 and a tube 421-2 to the sub-cooling portion 405 are branched. Furthermore, a block joint 426 is integrally connected to the manifold pipe 423 by soldering. The block joint 426 is provided with a tubular projected portion 428 for a flow of the coolant from the manifold pipe 423 to the modulator 100, and a screw thread hole 427. As shown in FIG. 22, the modulator 100 is provided, at the bottom end thereof, with a block joint 429 integrally connected thereto by soldering. As shown in FIG. 24, the block joint 429 forms an opening 429a to which the tubular projection 428 of the first block 428 of the manifold pipe 423 is inserted via an O-ring 431, so that the latter, at the upper surface 432 thereof, is in contact with the bottom surface 430 of the block joint 429 of the modulator 100. Furthermore, the block joint 429 is formed with a hole 429b (FIG. 22) to which a bolt 429c is freely introduced, so that the bolt 429c engages with the screw thread hole 427 of the block joint 426, whereby the block joints 426 and 429 are connected to each other. The O-ring 421 between the block joints 426 and 429 maintains a fluid tight connection therebetween.

Figure 25:
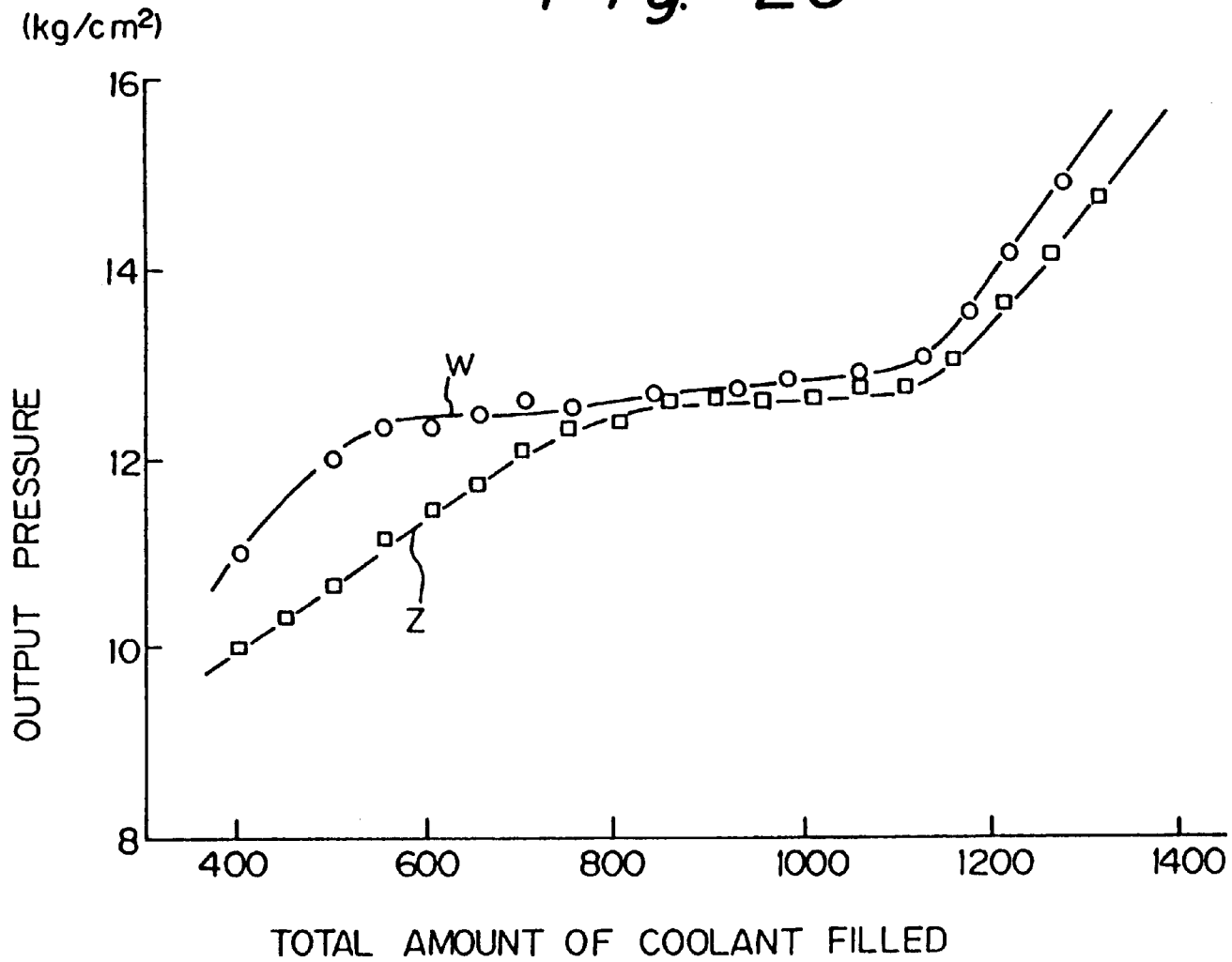
FIG. 25 shows a relationship between the amount of coolant filled in the refrigerating recirculating system and the output pressure of the compressor.

The arrangement of the modulator 100 branched from the heat exchanger 400 at a location along the coolant passageway therein permits the portion downstream of the branched portion to be used as the sub-cooling portion 405, which can increase a difference in an enthalpy for increasing the cooling ability. Nevertheless, the arrangement of the modulator 100 branched from the heat exchanger at a location along the coolant passageway of the heat exchanger inevitably reduces an effective area of the condenser portion 402, which increases the output pressure from the compressor 200. FIG. 25 shows a result of experiments by the inventors, for illustrating an increase in the pressure of the output of the compressor 200 as a result of the provision of the modulator 100 in the heat exchanger 400 as shown in FIG. 10. In FIG. 25, the abscissa is the total amount of coolant filled in the system, and the ordinate is an output pressure. A line W shows a result obtained when the modulator 100 is used as arranged in FIG. 10, and a line Z shows a result obtained when a prior art device provided with the receiver 401 is used. As will be seen from the curve W according to the present invention, a desired amount of coolant is in a range of between about 600 grams to about 1200 grams. When the amount of the coolant is short by about 600 grams, there is a sharp drop in the output pressure due to the shortage in the amount of coolant. When the amount of coolant is larger than about 1200 grams, there is a sharp increase in the output pressure, which means that an excess amount of the coolant is filled in the system. As will be seen from the comparison of the result (curve W) of the present invention, the construction of the present invention including the modulator 100 can increase the output pressure of the compressor 200, compared with the result (curve Z) of the prior art, but the increase in the output pressure as obtained in the present invention is not large.

Figure 26:
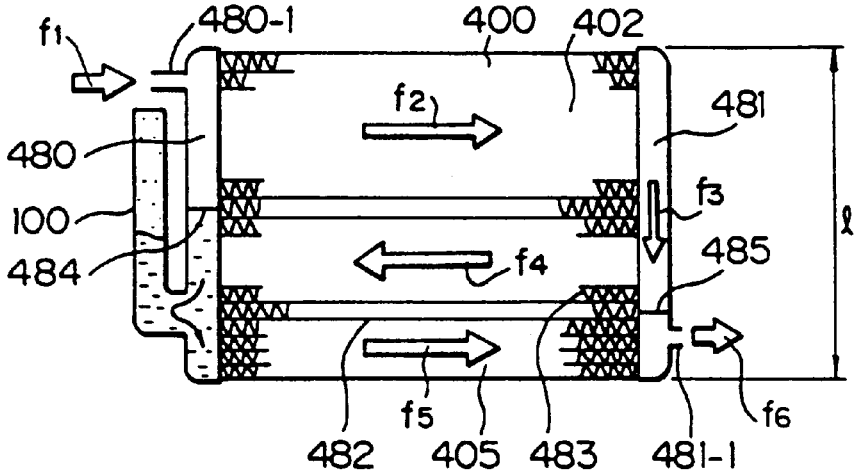
FIG. 26 is a schematic front view of the heat exchanger in another embodiment of the present invention.

In the embodiment as described above (FIG. 10), the heat exchanger 400 is constructed by a condenser portion 402 and sub-cooling portion 405, which are constructed by serpentine tubes, but the heat exchanger 400 can be constructed from a plurality of parallel tubes 482 having a flattened cross sectional shape, as shown in FIG. 26. This type of the heat exchanger 400 includes, on both sides thereof, horizontally spaced tank portions 480 and 481 between which a plurality of horizontal parallel pipes 482 having a flattened shape are arranged to be vertically spaced therein. Corrugated fins 483 are arranged between the adjacent flattened pipes 482 such that the fins are connected to the surfaces of the pipes 482 by soldering, and partition plates 484 and 485 are arranged in the side tanks 480 and 481, respectively. The partition plate 484 in the side tank 480 is located at a higher position than the partition plate 485 in the side tank 481. An coolant inlet 480-1 is opened to the space inside the tank 480 above the partition 484, and the coolant outlet 481-1 is opened to the space inside the tank 481 below the partition 485. As a result, an "S" shaped flow of the coolant is obtained, from the inlet 480-1 to the outlet 481-1, as shown by arrows f1, f2, f3, f4, f5 and f6.

Figure 23:
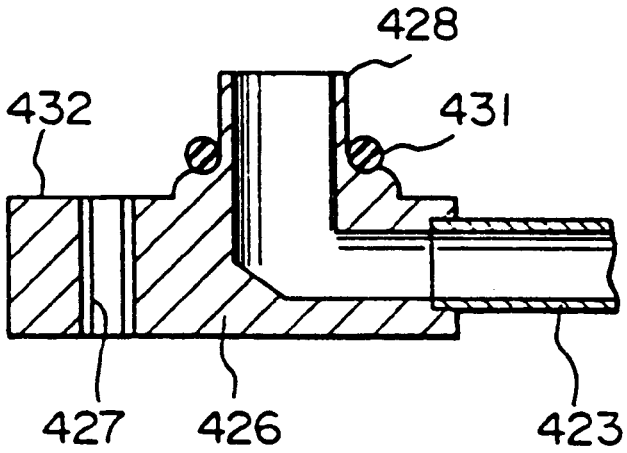
FIG. 23 is a cross sectional view of an upper joint in the modulator in FIG. 22.
Figure 27:
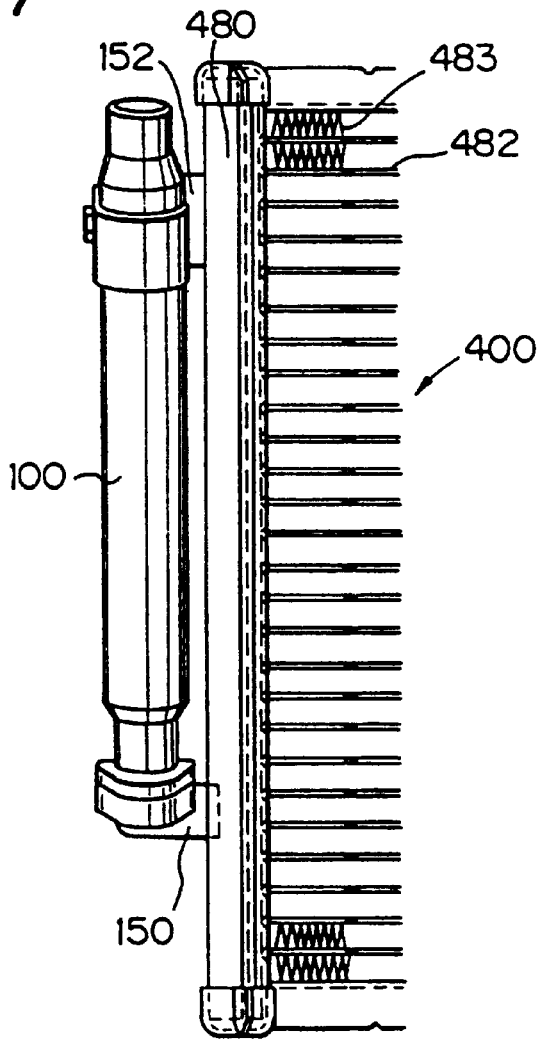
FIG. 27 is a detailed view of a modulator in FIG. 26.
Figure 28:
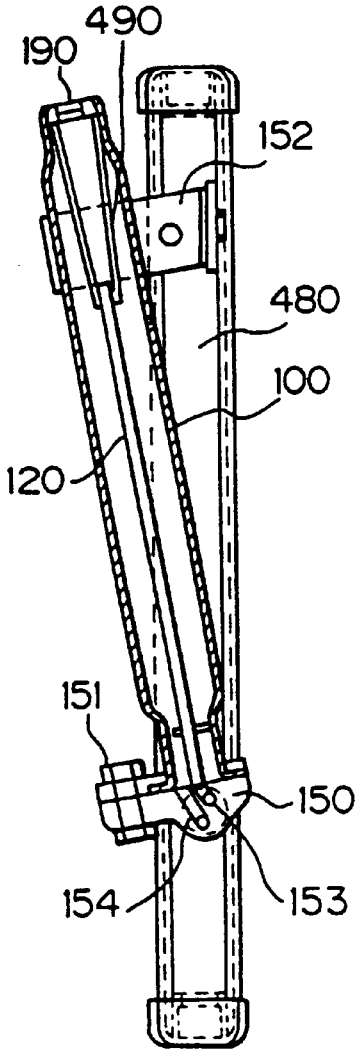
FIG. 28 is side view of the heat exchanger, and illustrates the modulator with respect to the tank of the heat exchanger.
Figure 29:
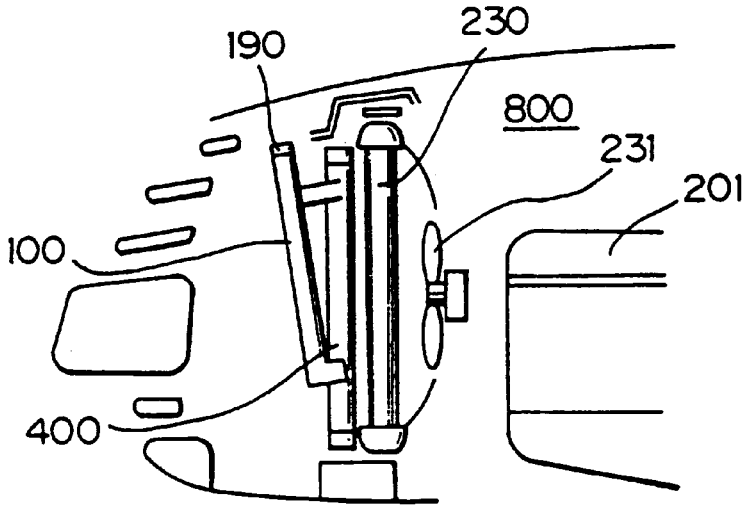
FIG. 29 illustrates an arrangement of the heat exchanger provided with a modulator in FIG. 26, in an engine room of a vehicle.

According to this embodiment of the present invention, the modulator 100 is branched from the side tank 480-1 at a position below the partition 484. FIG. 27 shows details of the means for connecting the modulator 100 to the heat exchanger 400. The modulator 100 is supported by the side tank 480 at the bottom end thereof by a joint 150. The joint 150 is also used for obtaining a fluid communication between the modulator 100 and the tank 480, and the construction of this joint is similar to that shown in FIGS. 23 and 24. The modulator 100 is supported, at the top end thereof, by a supporting plate 152. As shown in FIG. 28, when viewed from the side of the heat exchanger 400, the modulator 100 is slightly inclined in the forward direction when arranged in an engine room 800 of a vehicle as shown in FIG. 29, which makes it easy for an operator to visually check the level of the coolant in the modulator 100, via the sight glass 190 arranged at the top end of the modulator 100 as shown in FIG. 6. As shown in FIG. 28, a bolt 151 is provided for connecting a pair of joints in the same manner as explained with reference to FIGS. 23 and 24. Furthermore, an inner induction pipe 120, as explained with reference to FIG. 18, is provided in the modulator 100, and is connected to an opening 153 in a partition, which opening corresponds to the opening 423-1 in FIG. 18. The partition is further provided with an opening 153 for a direct connection of the bottom portion of the modulator 100 with the tank 480, which opening 153 corresponds to the opening 424 in FIG. 18. According to the embodiment as shown, the inner diameter of the opening 153 to the induction pipe 120 is 3.5 mm, and the inner diameter of the induction pipe 120 is 5 mm. Furthermore, as will be easily seen from FIG. 28, the induction pipe 120 is connected to the modulator 100 at the inner wall thereof by stay members 490, to prevent a movement of the induction pipe 120.

FIG. 29 shows an arrangement of the modulator in the engine room 800 of a vehicle, with regard to the other components of the engine. In FIG. 29, reference numeral 230 denotes a radiator for cooling a coolant for an internal combustion engine 201. The radiator 230 is arranged so as to face a fan 231 driven by a crankshaft (not shown) of the engine body 201. The heat exchanger 400 for the refrigerating system according to the present invention is arranged in front of the radiator 230. As already explained, the modulator 100 on one side of the heat exchanger 400 is inclined with respect to the heat exchanger 400 in the forward direction of the engine chamber of the vehicle, to allow the operator to check the level of the coolant in the modulator 100 by using the sight glass 190 at the top end thereof when an engine hood 800' is open.

Figure 30:
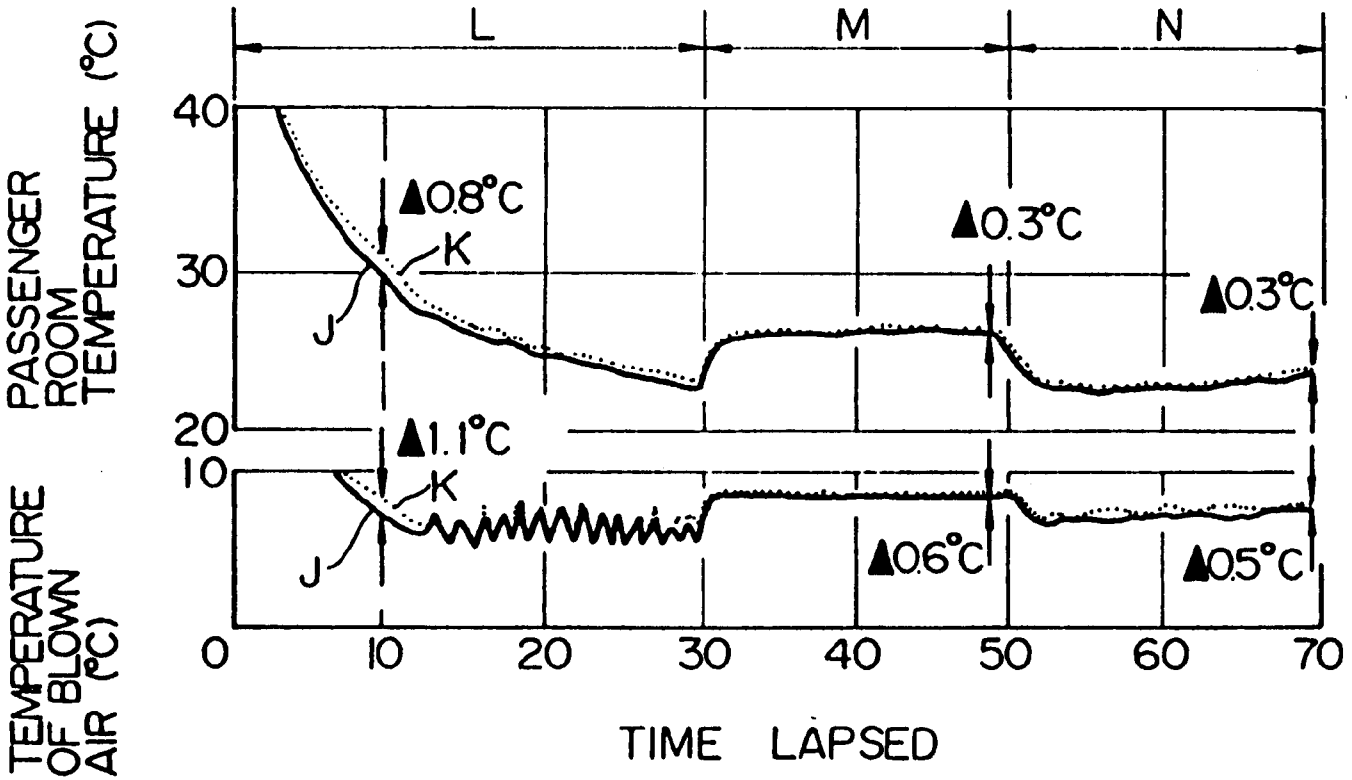
FIG. 30 shows a relationship between the time lapsed and a temperature in a passenger room and a temperature of blown out cooling air.

FIG. 30 shows a difference in the refrigerating ability of the refrigerating system for a vehicle as shown in FIG. 29, having the modulator 100, and a prior art refrigerating system as shown in FIG. 7 having the receiver 401. In FIG. 30, the abscissa shows the time lapsed, and the ordinate shows, at the upper part thereof, the temperature of the air blown into a passenger room of the vehicle, and at the lower part thereof, the temperature of the passenger room. Lines designated by K are results obtained by the prior art system having the receiver 401 in FIG. 7, and lines designated by J are results obtained by the system according to the present invention provided with the modulator 100 as shown in FIG. 29. Along the abscissa, a portion L corresponds to a running condition of the vehicle at a speed of 40 km/h, wherein air from the passenger room is recirculated into the evaporator 310 and a large amount of air is introduced into the evaporator 310; a portion M corresponds to a running condition of the vehicle at a speed of 60 km/h, wherein an outside air having a temperature of 35 degrees centigrade and a humidity of 60% is introduced into the evaporator 310, and a medium amount of air is introduced into the evaporator 310; and a portion N corresponds to a running condition such that the vehicle is stopped by heavy traffic but the engine is running, wherein air from the passenger room is recirculated into the evaporator 310, and a large amount of the air is introduced into the evaporator 310. As will be easily seen from FIG. 30, at the area N where the vehicle is stopped, the engine idling speed was 740 r.p.m. on the line K for the prior art refrigerating system provided with the receiver 401, but the engine idling speed was 660 r.p.m. on the line J for the refrigerating system according to the present invention provided with the modulator 100.

As explained above, in the refrigerating system provided with a modulator according to the present invention, an increase in the cooling ability can be obtained over the entire range of operation of the vehicle. In particular, as will be seen from FIG. 30, the system according to the present invention provided with the modulator can reduce the engine idling speed while obtaining an increased cooling ability, resulting in an increase in the fuel consumption efficiency for the internal combustion engine 201.

Figure 31:
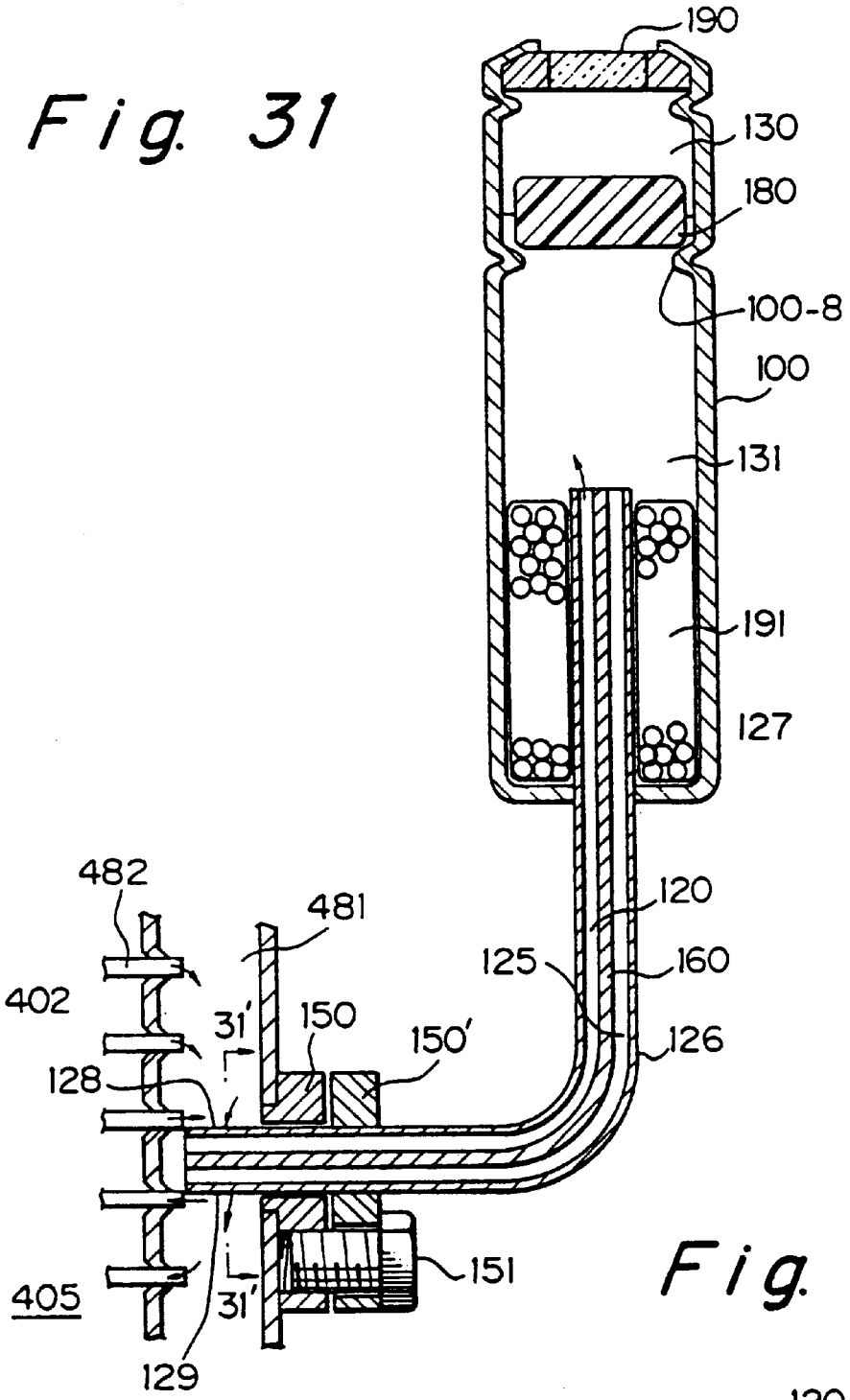
FIG. 31 shows another modification of a modulator provided with an induction pipe for an introduction of a gas state coolant to the modulator from a tank of the heat exchanger.
Figure 31:
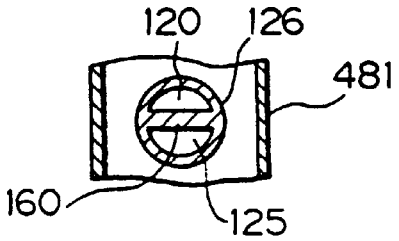

FIG. 31 shows another embodiment of the modulator 100 when connected to the side tank 481, to which a plurality of vertically spaced parallel horizontal pipes 482 are connected and a fluid communication therebetween occurs as shown in FIG. 27. A connection pipe 126 is provided for the connection to the tank 481, and the pipe 126 is provided, along the entire length thereof, with a partition 160 whereby an induction passageway portion 120 above the partition 160 and a flow out passageway portion 125 below the partition 160 are created, as shown in FIG. 31'. A sight glass 190 is connected to the upper end of the modulator 100, and a float member 180 is arranged in the variation margin portion 130 inside the modulator 100. The function of the variation margin portion 130 has been described with reference to FIG. 20. An annular projection 100-8 is formed on the inner wall of the modulator 100, to engage the float 180 and prevent it from moving downward when the level of the liquid coolant in the modulator 100 is lower than a predetermined limit. The sight glass 190 allows the level of the liquid coolant in the modulator to be visually monitored. A block 191 having a tubular shape drying agent is arranged around the upper end of the pipe 126 projected into the space inside the modulator 100, and absorbs moisture in the coolant.

Figure 33:
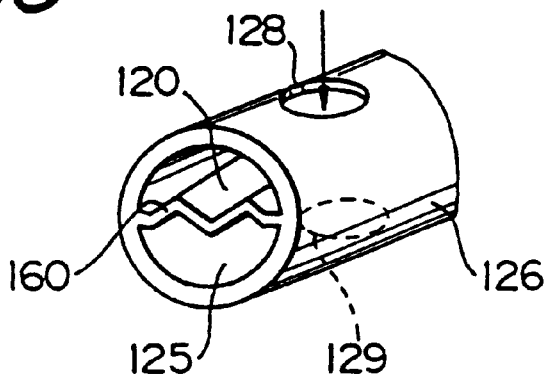
FIG. 33 is a schematic view of a portion of a pipe for connection to the tank of the heat exchanger.

As shown in FIG. 33, the top wall of the pipe 126 is provided with an opening 128 open to the induction passageway portion 120. The opening 128 is used for a communication of the space inside the tank 181 above the pipe 126 with the induction passageway portion 120, as will be seen from FIG. 31, so that an amount of the coolant in the tank 481 from the condenser portion 402 is introduced into the modulator 100 via the induction passageway portion 120. The location of the opening 128 is determined such that a gaseous coolant in the tank 481 is easily introduced into the induction passageway portion 120 due to the dynamic pressure of the flow of the coolant in the tank 481. As shown in FIG. 33, the bottom wall of the pipe 126, opposite to the opening 128, is provided with an opening 129 open to the flow out passageway portion 125. The opening 129 is used for a communication of the space inside tank 181 below the pipe 126 with the flow-out passageway portion 125, as will be seen from FIG. 31, so that an amount of the coolant in the modulator 100 flows from the modulator 100 into the tank 481 via the return passageway portion 125, and then into the sub-cooling portion 405. The pipe 126 passes through the joint 150, which is fitted and fixed to the side wall of the tank 481, and through a supporting member 150' resting on the joint 150 and fixed thereto by a bolt 150.

Figure 32:
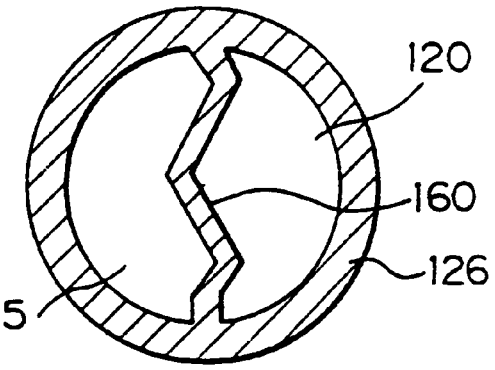
FIG. 32 is cross sectional view of the induction pipe in FIG. 31.

The pipe 126 as shown in FIG. 31 and 32 is made of an aluminum alloy drawn to obtain a desired cross-sectional shape. The pipe 126 is connected to the modulator 100 and the joint 150 by soldering. In FIGS. 32 and 33, the partition wall 160 between the passageway portions 120 and 125 is corrugated, but this wall 160 can have other shapes, such as a plane shape. As already explained, the partition wall 160 can be formed integrally by a drawing process, but instead of employing the drawing process, the partition wall 160 can be formed as a separate member and fixedly arranged inside the pipe 126.

Figure 34:
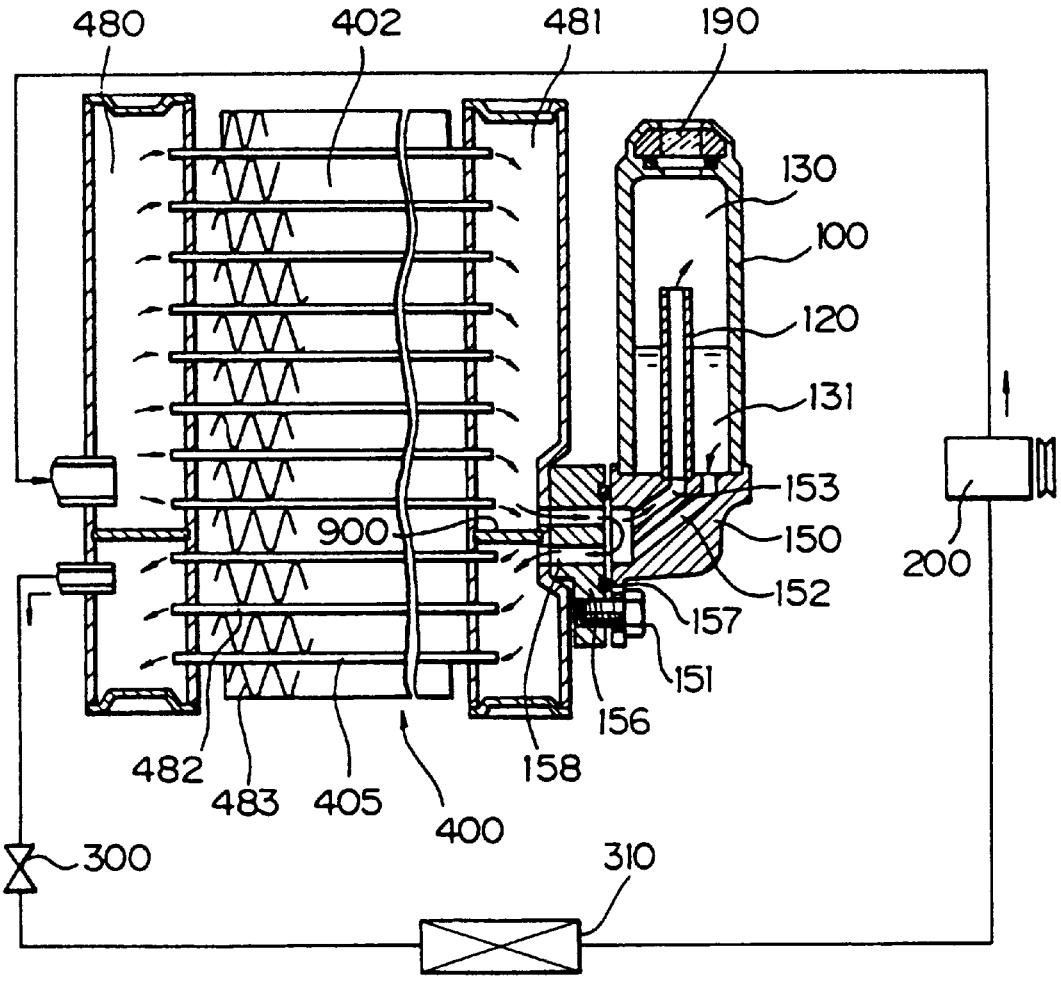
FIG. 34 shows another embodiment provided with a joint means between the coolant passageway and induction pipe.

FIG. 34 shows, another embodiment of the present invention in a construction of a parallel pipe type heat exchanger, which is provided with a joint 150 in which an induction passageway 153 and a flow-out passageway 152 are formed. The joint 150 is connected by a bolt 151 to a base plate 156 fixedly connected to the side tank 481, and a partition 900 is arranged in the side tank 481, to divide the space inside the tank 481 into upper and lower portions. The base plate (first joint) 156 forms, in cooperation with the second joint 150, a coolant passageway 158 therein which is bent in a substantially V shape, and is connected at one end to the upper portion of the tank 481 and at the other end to the lower portion of the tank 481. The passageway 158 is connected to the passageway 153 in the joint 150, which is connected to the induction pipe 120 in the modulator 100, and as a result, a positive introduction of the gaseous coolant from the upper tank portion can be positively introduced into the upper portion of the space inside the modulator 100. In this embodiment, the joint 156, to which the second joint 150 is connected by the bolt 151, is connected to the tank 481 by soldering. Also, an 0-ring 157 is arranged between the facing surfaces of the joints 156 and 150, to obtain an air tight connection therebetween.

Note, in the construction of FIG. 34, the induction passageway 153 in the joint portion 150 is arranged so that it extends into the coolant passageway 158 in such a manner that the passageway 153 is substantially opposite to the direction of the flow of the coolant in the passageway 156. As a result, an effective introduction to the induction passageway 153 of a gaseous coolant in the passageway 158 is obtained.

Figure 35:
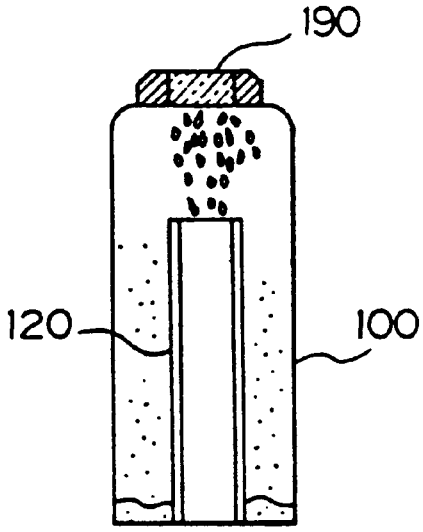
FIG. 35 diagrammatically illustrates a condition of a coolant in the upper portion of the modulator when an insufficient amount of coolant is filled in the modulator.
Figure 36:
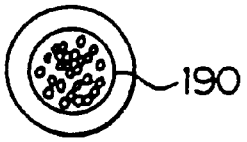
FIG. 36 shows an inside of the modulator as viewed via a sight glass at the upper end of the modulator in the coolant condition as shown in FIG. 35.

FIG. 35 to 40 show various conditions of the coolant as filled in the modulator, when visually observed. FIGS. 35 and 36 show a state where there is a shortage in the amount of coolant filled in the modulator 100, and there is substantially no liquid coolant therein, so that there are many gas bubbles included in the liquid coolant introduced into the modulator 100 via the induction pipe 120. This situation can be determined by observing, via the sight glass 190, white bubbles that appear inside the modulator.

Figure 37:
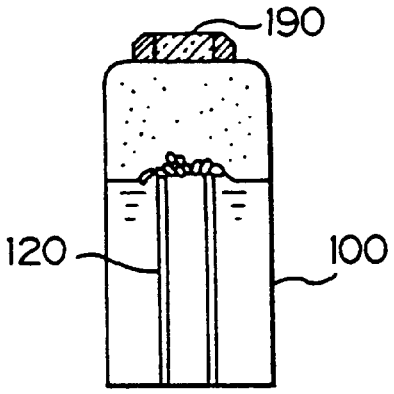
FIG. 37 diagrammatically illustrates a condition of the coolant in the upper portion of the modulator when a proper amount of coolant is filled in the modulator.
Figure 38:
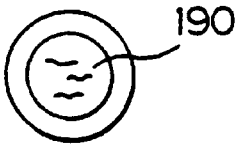
FIG. 38 shows the inside of the modulator as viewed via a sight glass at the upper end of the modulator in the coolant condition as shown in FIG. 37.

FIGS. 37 and 38 show a situation wherein a suitable amount of the coolant is filled in the modulator. In this situation, the coolant introduced into the modulator 100 via the induction pipe 120 includes a small amount of gas, and thus the gas-coolant boundary in the induction pipe 120 is at substantially the same level as that in the modulator 100, which allows the level of the liquid at the induction pipe 120 to be observed from outside of the modulator via the sight glass 190.

Figure 39:
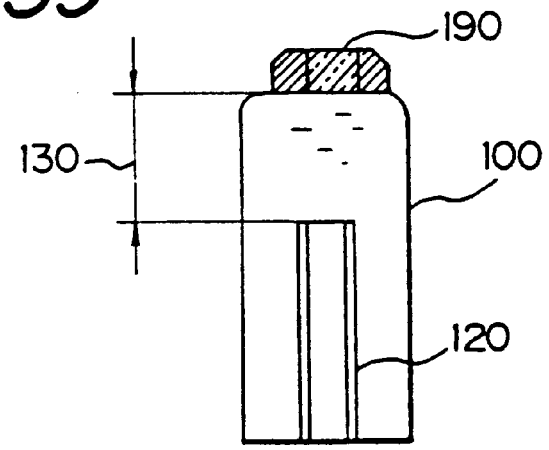
FIG. 39 diagrammatically illustrates a condition of the coolant in the upper portion of the modulator when an excess amount of coolant is filled in the modulator.
Figure 40:
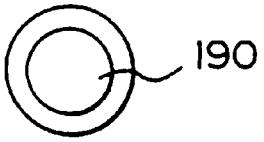
FIG. 40 shows the inside of the modulator as viewed via a sight glass at the upper end of the modulator in the coolant condition as shown in FIG. 39.

FIGS. 39 and 40 show a situation wherein an excess of coolant is charged within the modulator. In this case, the liquid state coolant occupies not only the charging margin portion 131 but also the variation margin portion 130, which makes it impossible to observe from the outside the level of the liquid in the modulator 100. This shows the user that an excess charging of the coolant has occurred.

Figure 41:
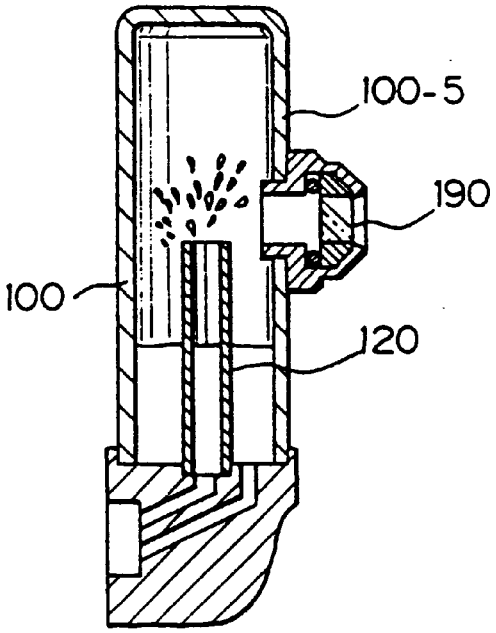
FIG. 41 is a vertical cross sectional view of a modification of the modulator, wherein a sight glass is provided at the side wall thereof.
Figure 42:
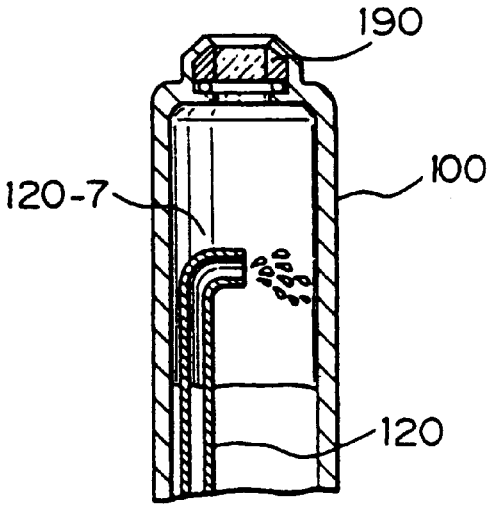
FIG. 42 is a vertical cross sectional view of another modification of the modulator, wherein an upper end of the induction pipe is angled.

In place of the previous embodiments, wherein the sight glass 190 is arranged at the top of the modulator, the embodiment shown in FIG. 41 includes a sight glass 190 arranged at the side wall 100-5 at a position which allows the user to make a direct observation through the upper end of the induction pipe 120.

In an arrangement whereby the sight glass 190 is located at the top of the modulator, the induction pipe 120 is provided with upper end 120 which is bent so as to extend horizontally for a short length thereof. This construction also allows the user to observe the condition of coolant at the outlet end of the induction pipe 120.

Figure 43:
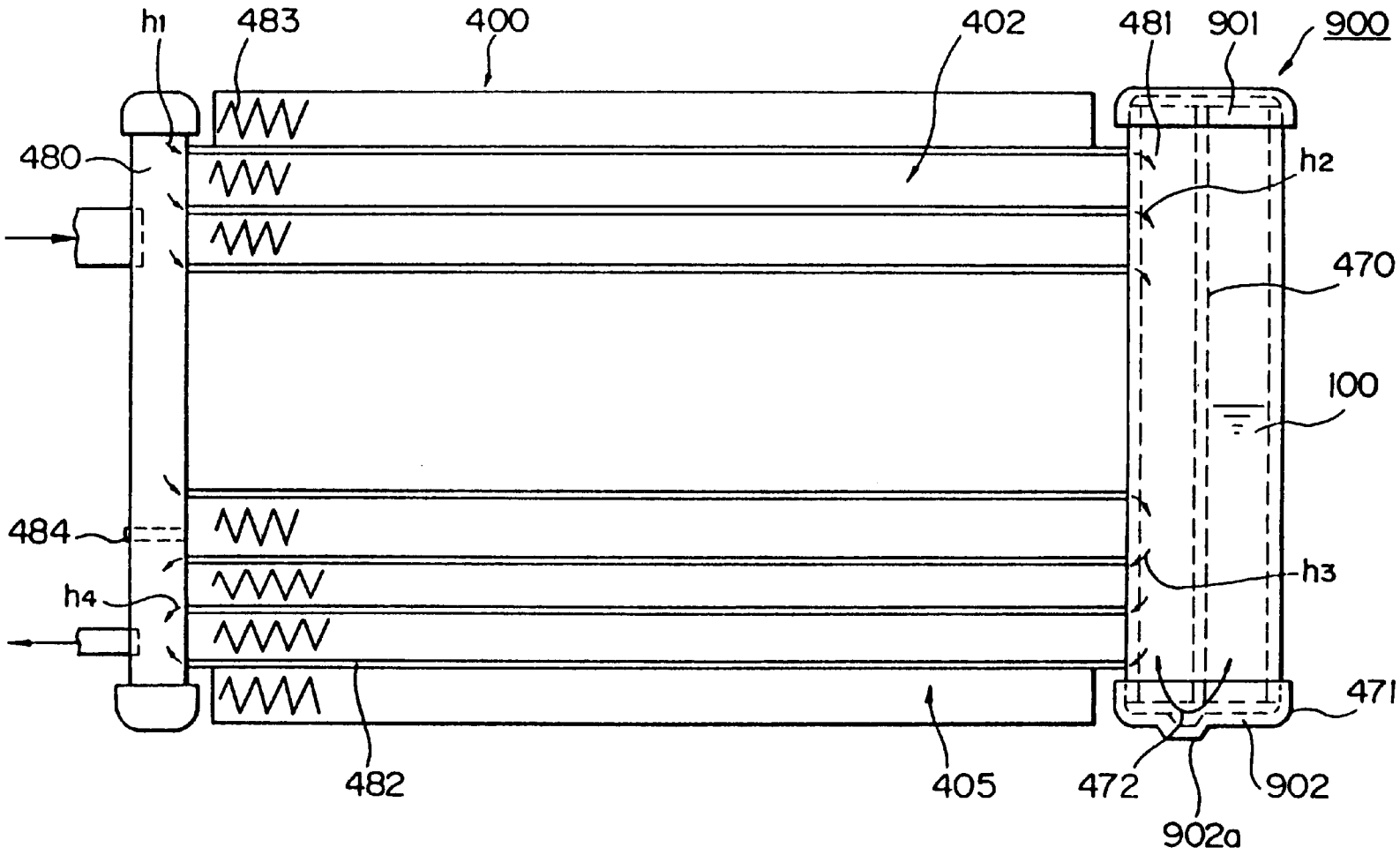
FIG. 43 shows another embodiment of the present invention wherein the side tank and the modulator are combined.

FIG. 43 show a modification of the condenser 400 provided with a plurality of parallel pipes connected to side tanks; the modulator 100 being connected to one of the side tanks. In this embodiment, the modulator 100 is integral with the side tank 481, and the side tank 900 has an inner vertically extending partition 470 which forms, on the inner side thereof, a side tank 481 to which a plurality of vertically spaced heat exchange pipes 482 are opened, and forms on the outer side thereof a modulator 100. The tank 900 also has an upper cap 901 and lower cap 902. A partition 484 is arranged in the side tank 480, to obtain a flow of coolant introduced into the condenser portion 402 and to the side tank 481, and then flowing from the modulator 100 to the sub-cooling portion 405, whereby a U-shaped flow of the coolant is obtained between the inlet and outlet of the heat exchanger 400, as shown by the arrows h1, h2, h3 and h4. The bottom cap 902 is provided with an outwardly projecting portion 902a which allows the bottom end of the partition 470 to be spaced from the lower cap 902 so that a communication passageway 472 is formed therebetween to thereby allow a communication of the coolant between the side tank 481 and the modulator 100.

Figure 45:
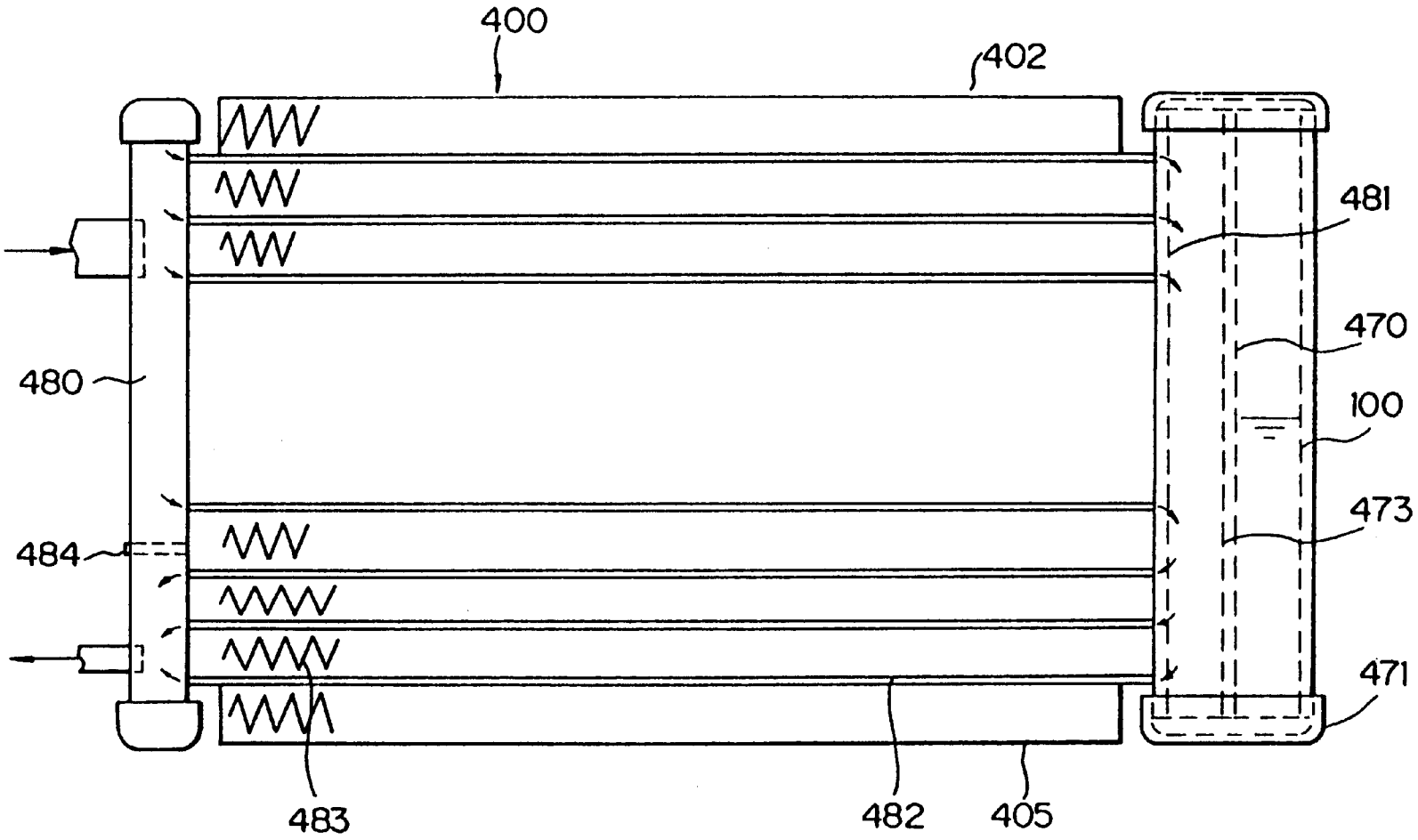
FIG. 45 shows still another embodiment of the present invention, which is similar to FIG. 43 but having differences in the construction for a communication of the tank with the modulator.

FIG. 45 shows a modification wherein, instead of the shaped portion 902a shown in FIG. 43, the partition 470 is formed by an upper portion without perforations and a bottom portion 473 which is perforated. Note, the upper end of the perforated portion 473 is located at the position which is substantially the same as the position at which a boundary between the condenser portion 402 and sub-cooling portion 405 is situated. In this embodiment, part of the coolant directed from the condenser portion 402 toward the sub-cooling portion 405 is introduced into the modulator 100 via the perforated part 473 of the partition 470.

Also note, in the embodiment shown in FIG. 43 or 45, another partition is arranged not only in the tank 480 but also in the tank 481, in the same way as shown in FIG. 26, to provide an "S" shape flow of the coolant in the heat exchanger 400.

Although embodiments of the present invention are described with reference to the attached drawings, many modifications and changes can be made by those skilled in this art without departing from the scope and spirit of the present invention.

We claim:

1. A refrigerating apparatus, comprising:

a coolant recirculation line;

a compressor in the recirculation line for compressing the coolant;

a condenser in the recirculation line for condensing the compressed coolant;

means in the recirculation line for expanding the condensed coolant by reducing the pressure thereof;

an evaporator in the recirculation line for evaporating the reduced pressure coolant, the coolant passed through the evaporator being introduced into the compressor, so that a flow of the coolant for recirculation in the recirculation line is created, to thereby obtain a refrigerating cycle; and a modulator defining therein a chamber for receiving from the condenser only a part of the total amount of the coolant subjected to the refrigerating cycle;

wherein said chamber has a closed top end and an open bottom end that are vertically spaced, with the bottom end being connected to the recirculation line at a position between the condenser and the expansion means;

wherein the modulator and the recirculation line are disposed so that at least a portion of the refrigerating medium from the condenser always flows below said bottom open end of the chamber;

wherein said modulator and said condenser being disposed so that the modulator and condenser are located in a substantially common temperature atmosphere; and wherein the bottom end of said chamber is, without substantially throttling its inner dimension, open to flow from the condenser, thereby allowing a gaseous state refrigerant in the flow to be freely introduced into the chamber by its buoyancy without substantial resistance.

2. An apparatus according to claim 1, wherein said modulator is connected to said the recirculation line at a position downstream of the condenser and upstream of the pressure reducing means.

3. An apparatus according to claim 1, wherein said condenser is provided with an inlet for a flow of coolant from the compressor, and outlet for a discharge of gas to the pressure reducing means, at least one pipe arranged in a serpentine form, to provide spaced portions connected with each other in series, and fins mounted on the pipe and arranged between adjacent pipe portions.

4. An apparatus according to claim 3, wherein two serpentine passageways are arranged in parallel between the inlet and the outlet.

5. A refrigerating apparatus, comprising:

a coolant recirculation line;

a compressor in the recirculation line for compressing the coolant;

a condenser in the recirculation line for condensing the compressed coolant;

a super cooler in the recirculation line for receiving the condensed coolant from the condenser;

means in the recirculation line for expanding the condensed coolant from the super cooler by reducing the pressure thereof;

an evaporator in the recirculation line for evaporating the reduced pressure coolant from the expanding means, the coolant passing through the evaporator being introduced into the compressor, so that a flow of the coolant in the recirculation line is created to thereby obtain a refrigerating cycle; and a modulator defining therein a chamber for receiving from the condenser only a part of the total amount of the coolant subjected to the refrigerant cycle;

wherein said chamber has a closed top end and an open bottom end that are vertically spaced, with the bottom end being connected to the recirculation line at a position between the condenser and the super cooler;

wherein the modulator and the recirculation line are disposed so that the refrigerating medium from the condenser always flows below said bottom open end of the chamber;

wherein said modulator and said condenser being disposed so that the modulator and condenser are located in a substantially common temperature atmosphere; and wherein the bottom end of said chamber is, without substantially throttling its inner dimension, open to flow from the condenser, thereby allowing a gaseous state refrigerant in the flow to be freely introduced into the chamber by its buoyancy without substantial resistance.

6. A refrigerating apparatus according to claim 5, wherein said condenser and the super cooler are combined to provide a single heat exchanger unit, and further comprises connecting means for connecting the heat exchanger unit with the modulator so that only a part of the flow from the condenser to the super cooler is introduced into the modulator.

7. A refrigerating apparatus according to claim 5, wherein the super cooler has a heat emission area having a ratio based on the sum of the heat emission area of the condenser and the heat emission area of the super cooler, the value of the ratio being in a range of between 0.1 and 0.3.

8. A refrigerating apparatus according to claim 6, wherein said condenser and the super cooler are constructed by at least one serpentine pipe located at the coolant recirculation line, wherein said connecting means comprises a manifold pipe having portions for connection to the condenser, super cooler and modulator, respectively, and a joint means for connecting said portions to the modulator.

9. An apparatus according to claim 8, wherein said joint means comprises a first joint member connected to the manifold pipe, a second joint member connected to the modulator, and a means for obtaining a fluid tight connection between the first and second joint members.

10. A refrigerating apparatus according to claim 6, wherein said condenser and super cooler of the heat exchanger unit each comprise a plurality of spaced parallel pipes, and wherein the heat exchanger unit further comprises a pair of spaced tanks between which the pipes of the condenser and the super cooler are arranged so that the tanks communicate with the pipes, at least one of the tanks having a partition for dividing the space inside thereof into first and second portions, the first portion of the first tank being connected to the compressor for an introduction of the coolant to be condensed into the pipes constructing the condenser, so that a flow of the coolant from the compressor to the super cooler is obtained via the first and second tank, said modulator being connected to the tank at a position for an introduction of the coolant from the compressor into the super cooler.

11. A refrigerating apparatus according to claim 10, wherein said second tank is also provided with a partition located at the level below the partition in the first tank, for dividing the space therein into upper and lower portions so that the coolant introduced into the upper portion of the first tank is introduced into the condenser and to the upper portion of the second tank, and then returned to the pipes of the condenser and into the lower portion of the first tank, and finally, flows into the pipes of the super cooler and to the lower portion of the second tank and into the pressure reducing means, wherein the modulator is connected to the lower portion of the first tank for an introduction of only a part of the entire coolant used for the recirculation cycle.

12. An apparatus according to claim 10, wherein said tank and the modulator have an integral construction composed of a tubular member having vertically spaced open ends, upper and lower caps connected to those upper and lower ends, and a vertically extending partition for dividing a space in the tube into the second tank and the modulator, the partition defining a passageway means for a communication of the second tank with the modulator.

13. An apparatus according to claim 12, wherein said passageway means comprises a portion of the bottom cap spaced from the bottom end of the partition, for forming a passageway for a connection of the second tank with the modulator.

14. An apparatus according to claim 12, wherein said passageway means comprises a perforated bottom portion of said partition for a communication of the second tank with the modulator.

15. An apparatus according to claim 10, wherein said connecting means comprises passageway means for diverting a portion of the flow of the coolant in the tank and for re-introducing the liquid from the modulator to the tank toward the super cooler, and means for a connection of the passageway means with the tank.

16. An apparatus according to claim 15, wherein said passageway means comprise a partition having a first opening, and a pipe having one end connected to the first opening and a second end opened to the inside of the modulator, said partition having a second opening for an introduction of the liquid in the modulator into the tank toward the super cooler.

17. An apparatus according to claim 15, wherein said passageway means comprises a pipe having one end opened to the tank and a second end opened to the inside of the modulator, the pipe having therein a partition along the length thereof providing a pair of passageways connected to the condenser and the super cooler, respectively, and means for fixing the pipe to the tank.

18. An apparatus according to claim 10, wherein said tank is provided with a partition in the tank across the space therein, and said connection means comprises a first joint means connected to the tank and cooperating with the partition for generating a bent flow of the coolant in the tank, a second joint for a connection of the joint with the modulator, said second joint being provided with a passageway for taking out a flow of coolant from the passageway into the modulator, and a second passageway for returning the coolant from the modulator to the first passageway.

19. An apparatus according to claim 18, further comprising a pipe arranged in the modulator for a connection of the passageway with the space inside the modulator.

20. A modulator for a refrigerating system having a recirculation passageway in which a compressor, a condenser and a pressure reducing means are disposed in series to thereby obtain a refrigerating cycle, said modulator comprising:

means for defining a chamber for receiving from the condenser only a part of the total amount of coolant subjected to the refrigerating cycle, said chamber having a closed top end and an open bottom end that are vertically spaced, with the bottom end being connected to the recirculation passageway at a position between the condenser and the pressure reducing means;

wherein the modulator and the recirculation passageway are disposed so that the refrigerating medium from the condenser always flows below said bottom open end of the chamber;

wherein said modulator and said condenser being disposed so that the modulator and condenser are located in a substantially common temperature atmosphere;

wherein the bottom end of said chamber is, without substantially throttling its inner dimension, open to flow from the condenser, thereby allowing a gaseous state refrigerant in the flow to be freely introduced into the chamber by its buoyancy without substantial resistance.

21. A modulator according to claim 20, further comprising a sight glass for observing the level of the coolant therein.

22. A modulator for a refrigerating system having a recirculation passageway in which a compressor, a condenser, a super cooler and a pressure reducing means are disposed in series to thereby obtain a refrigerating cycle, said modulator comprising:

means for defining a chamber for receiving from the condenser only a part of the total amount of coolant subjected to the refrigerating cycle, said chamber having a closed top end and an open bottom end that are vertically spaced, with the bottom end being connected to the recirculation passageway at a position between the condenser and the super cooler;

wherein the modulator and the recirculation passageway are disposed so that the refrigerating medium from the condenser always flows below said bottom open end of the chamber;

wherein said modulator and said condenser being disposed so that the modulator and condenser are located in a substantially common temperature atmosphere;

wherein the bottom end of said chamber is, without substantially throttling its inner dimension, open to flow from the condenser, thereby allowing a gaseous state refrigerant in the flow to be freely introduced into the chamber by its buoyancy without substantial resistance.

23. A modulator according to claim 22, further comprising a sight glass for observing the level of the coolant therein.

24. An air conditioning system for a vehicle having an engine room in which an internal combustion engine and a radiator are disposed, said system comprising:

a coolant recirculation line;

a compressor in the recirculation line for compressing the coolant, the compressor being connected to and driven by an engine rotating shaft;

a heat exchanger having a condenser portion in the recirculation line for condensing the compressed coolant and a super cooler portion in the recirculation line for receiving the condensed coolant from the condenser;

said heat exchanger being disposed in the engine room and adjacent to the radiator;

means in the recirculation line for expanding the coolant from the super cooler by reducing the pressure thereof;

an evaporator in the recirculation line for evaporating the coolant, the evaporated coolant being introduced into the compressor so that a flow of the coolant in the refrigerant line is created for obtaining a refrigerating cycle; and a modulator including means for defining a chamber for receiving from the condenser portion only a part of the total amount of coolant subjected to the refrigerating cycle, said chamber having a closed top end and an open bottom end that are vertically spaced, with the bottom end being connected to the recirculation line at a position between the condenser portion and the super cooler portion;

wherein the modulator and the recirculation passageway are disposed so that the refrigerating medium from the condenser portion always flows below said bottom open end of the chamber;

wherein said modulator and said heat exchanger being disposed so that the modulator and condenser portion are located in a substantially common temperature atmosphere; wherein the bottom end of said chamber is, without substantially throttling its inner dimension, open to flow from the condenser, thereby allowing a gaseous state refrigerant in the flow to be freely introduced into the chamber by it s buoyancy without substantial resistance.

25. A system according to claim 24, wherein said modulator is arranged inclined, with respect to the heat exchanger unit, in the forward direction of the vehicle.

26. A system according to claim 25, wherein said modulator has a sight glass at a top portion of the engine room, to thereby allow the coolant level therein to be observed.

*27. A refrigerating apparatus, comprising:*

*a coolant recirculation line having a coolant flowing therein;*

*a compressor in the recirculation line for compressing the coolant;*

*a heat exchanger unit having a condenser portion in recirculation line for condensing the compressed coolant and a supercooler portion in the recirculation line for receiving the condensed coolant from the condenser;*

*means in the recirculation line for expanding the coolant from the supercooler by reducing the pressure of the coolant;*

*an evaporator in the recirculation line for evaporating the expanded coolant, the evaporated coolant being introduced into the compressor so that a flow of the coolant in the recirculation line is created for obtaining a refrigerating cycle; and*

*a modulator arranged in the recirculation line between the condenser and the supercooler, said modulator defining therein a chamber for receiving the coolant from the condenser subjected to the refrigerating cycle;*

*wherein said modulator defines a boundary between a main stream of the coolant flowing portion and a coolant restored portion, and only a part of the total amount of the coolant is introduced into the modulator chamber through said boundary;*

*wherein said condenser and said supercooler each comprises a plurality of spaced parallel pipes, and wherein the heat exchanger unit further comprises a first tank and a second tank between which the pipes of the condenser and the supercooler are arranged so that the tanks communicate with the pipes;*

*wherein said first tank has a partition for dividing space inside said first tank into upper and lower portions, the upper portion of the first tank being connected to the compressor for an introduction of the coolant to be condensed into the pipes in the condenser, so that the coolant introduced into the upper portion of the first tank from the compressor is introduced into the condenser and to an interior of the second tank;*

*wherein said modulator is connected to the second tank through a connecting portion at a position for an introduction of the coolant from the condenser into the supercooler, so that the coolant introduced from the modulator is introduced into the pipes in the supercooler and to the lower portion of the first tank;*

*wherein said second tank and said modulator are separated by a vertically extending partition defining at least a perforated portion for connecting the second tank with the modulator;*

*wherein said perforated partition is formed by an upper portion without perforations and a bottom perforated portion;*

*wherein said modulator and said condenser being disposed so that the modulator and the condenser are located in a substantially common temperature atmosphere;*

*wherein said boundary is, without substantially throttling its inner dimension, open to flow from the condenser, thereby allowing a gaseous state refrigerant in the flow to be freely introduced into the chamber by its buoyancy without substantial resistance.*

*28. A refrigerating apparatus according to claim 27, wherein said vertically extending partition is a single wall defining a passageway means for connecting the second tank with the modulator.*

*29. A refrigerating apparatus according to claim 27, wherein an upper end of said perforated portion is located*

*at a position which is substantially the same as the position at which a boundary between the condenser portion and the supercooler portion is situated.*

*30. A refrigerating apparatus, comprising:*

*a coolant recirculation line having a coolant flowing therein;*

*a compressor in the recirculation line for compressing the coolant;*

*a heat exchanger unit having a condenser portion in recirculation line for condensing the compressed coolant and a supercooler portion in the recirculation line for receiving the condensed coolant from the condenser;*

*means in the recirculation line for expanding the coolant from the supercooler by reducing the pressure of the coolant;*

*an evaporator in the recirculation line for evaporating the expanded coolant, the evaporated coolant being introduced into the compressor so that a flow of the coolant in the recirculation line is created for obtaining a refrigerating cycle; and*

*a modulator arranged in the recirculation line between the condenser and the supercooler, said modulator defining therein a chamber for receiving the coolant from the condenser subjected to the refrigerating cycle through a plurality of connecting portions;*

*wherein said modulator defines a boundary between a main stream of the coolant flowing portion and a coolant restored portion, and only a part of the total amount of the coolant is introduced into the modulator the modulator through said boundary;*

*wherein said condenser and said supercooler each comprises a plurality of spaced parallel pipes, and wherein the heat exchanger unit further comprises a first tank and a second tank between which the pipes of the condenser and the supercooler are arranged so that the tanks communicate with the pipes;*

*wherein said first tank has a partition for dividing space inside said first tank into upper and lower portions, and said second tank is also provided with a partition for dividing the space in said second tank into upper and lower portions, the upper portion of the first tank being connected to the compressor for an introduction of the coolant to be condensed into the pipes in the condenser, so that the coolant introduced into the upper portion of the first tank from the compressor is introduced into the condenser and to the upper portion of the second tank;*

*wherein said modulator is connected to the second tank at a position for an introduction of the coolant from the condenser into the supercooler;*

*wherein the upper portion of the second tank is provided with a first perforation connecting the upper portion of the second tank and the modulator, and the lower portion of the second tank is also provided with a second perforation connecting the lower portion of the second tank and the modulator, so that the condensed coolant introduced into the upper portion of the second tank flows toward the bottom portion of the modulator through the first perforation, and the liquid phase coolant from the modulator is introduced into the lower portion of the second tank through the second perforation and flows into the pipes of the supercooler;*

*wherein said modulator and said condenser being disposed so that the modulator and the condenser are located in a substantially common temperature atmosphere;*

*wherein said boundary portion is, without substantially throttling its inner dimension, open to flow from the condenser, thereby allowing a gaseous state refrigerant in the flow to be freely introduced into the chamber by its buoyancy without substantial resistance.*

*31. A refrigerating apparatus according to claim 30, wherein said condensed coolant introduced into the upper portion of the second tank always flows toward the modulator through said first perforation of the second tank.*

*32. A refrigerating apparatus, comprising:*

*a coolant recirculation line having a coolant flowing therein;*

*a compressor in the recirculation line for compressing the coolant;*

*a heat exchanger unit having a condenser portion in the recirculation line for condensing the compressed coolant and a supercooler portion in the recirculation line for receiving the condensed coolant from the condenser;*

*means in the recirculation line for expanding the coolant from the supercooler by reducing the pressure of the coolant;*

*an evaporator in the recirculation line for evaporating the expanded coolant, the evaporated coolant being introduced into the compressor so that a flow of the coolant in the refrigerant line is created for obtaining a refrigerating cycle; and*

*a modulator arranged in the recirculation line between the condenser and the supercooler, said modulator defining therein a chamber for receiving the coolant from the condenser subjected to the refrigerating cycle;*

*wherein said modulator defines a boundary between the main stream of the coolant flowing portion and the coolant restored portion, and only a part of the total amount of the coolant is introduced into the modulator chamber through said boundary;*

*wherein said condenser and said supercooler each comprises a plurality of spaced parallel pipes, and wherein the heat exchanger unit further comprises a first tank and a second tank between which the pipes of the condenser and the supercooler are arranged so that the tanks communicate with the pipes;*

*wherein said first tank has a partition for dividing space inside said first tank into upper and lower portions, one of the portions of the first tank being connected to the compressor for an introduction of the coolant to be condensed into the pipes in the condenser, so that the coolant introduced into the portion of the first tank from the compressor is introduced into the condenser and to an interior of the second tank;*

*wherein said modulator is connected to a predetermined part of one of said first and second tanks, to which the coolant passing through the pipes of the condenser is introduced, through a connecting portion at a position for an introduction of the coolant from the condenser into the supercooler, so that the coolant passed through the connecting portion of the modulator is introduced into the pipes in the supercooler;*

*wherein said one of said tanks and said modulator are separated by a vertically extending partition defining the connecting portion for connecting the predetermined part of said one of said tanks with the modulator;*

*wherein said partition is formed by an upper portion without perforations and a bottom portion defining the connecting portion;*

*wherein said modulator and said condenser being disposed so that the modulator and the condenser are located in a substantially common temperature atmosphere;*

*wherein said boundary is, without substantially throttling its inner dimension, open to flow from the condenser, thereby allowing a gaseous state refrigerant in the flow to be freely introduced into the chamber by its buoyancy without substantial resistance.*

* * * * *